United States Patent
Yabuuchi

(10) Patent No.: US 10,667,100 B2
(45) Date of Patent: May 26, 2020

(54) COMMUNICATION SYSTEM AND IN-VEHICLE COMMUNICATION APPARATUS

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventor: Yasuhiro Yabuuchi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/311,045

(22) PCT Filed: Jun. 26, 2017

(86) PCT No.: PCT/JP2017/023410
§ 371 (c)(1),
(2) Date: Dec. 18, 2018

(87) PCT Pub. No.: WO2018/003744
PCT Pub. Date: Jan. 4, 2018

(65) Prior Publication Data
US 2019/0335304 A1    Oct. 31, 2019

(30) Foreign Application Priority Data
Jun. 28, 2016   (JP) .................................. 2016-128028

(51) Int. Cl.
*H04W 4/44* (2018.01)
*G08G 1/0967* (2006.01)
(Continued)

(52) U.S. Cl.
CPC ........ *H04W 4/44* (2018.02); *G08G 1/096783* (2013.01); *G08G 1/123* (2013.01); *H04L 9/3268* (2013.01); *H04L 2209/84* (2013.01)

(58) Field of Classification Search
CPC ...... H04W 4/44; H04L 9/3263; H04L 9/3268; H04L 63/0823; H04L 9/32; G08G 1/096783
See application file for complete search history.

(56) References Cited

U.S. PATENT DOCUMENTS

2006/0255910 A1   11/2006  Fukushima et al.
2009/0235071 A1    9/2009  Bellur et al.
(Continued)

FOREIGN PATENT DOCUMENTS

JP   2002150183 A    5/2002
JP   2002312540 A   10/2002
(Continued)

OTHER PUBLICATIONS

International Search Report for Application No. PCT/JP2017/023410 dated Sep. 26, 2017.

*Primary Examiner* — Hongmin Fan
(74) *Attorney, Agent, or Firm* — Honigman LLP

(57) ABSTRACT

Provided are a communication system for an in-vehicle communication apparatus mounted in a vehicle, and the in-vehicle communication apparatus included in said communication system. The in-vehicle communication apparatus communicates with a certificate information issuing system which creates electronic certificate information, and acquires certificate information from a sub-server apparatus. The in-vehicle communication apparatus makes a request to the sub-server apparatus to create the certificate information, and the sub-server apparatus creates the certificate information in response to the request. The in-vehicle communication apparatus then makes an inquiry to the sub-server (Continued)

apparatus regarding the creation status of the certificate information. Upon receipt of the inquiry, the sub-server apparatus makes a response indicating whether or not creation of the requested certificate information has been completed, and if the creation of the certificate information has been completed, the sub-server apparatus transmits the created certificate information to the in-vehicle communication apparatus together with the response.

10 Claims, 12 Drawing Sheets

(51) Int. Cl.
*G08G 1/123* (2006.01)
*H04L 9/32* (2006.01)

(56) References Cited

U.S. PATENT DOCUMENTS

| 2011/0083011 A1* | 4/2011 | DiCrescenzo | H04L 9/006 |
| | | | 713/158 |
| 2011/0191581 A1* | 8/2011 | Shim | H04L 67/12 |
| | | | 713/158 |
| 2013/0067220 A1 | 3/2013 | Ando et al. | |
| 2014/0303881 A1 | 10/2014 | Ando et al. | |
| 2015/0256534 A1* | 9/2015 | Goudy | H04L 63/0823 |
| | | | 713/156 |
| 2015/0358170 A1 | 12/2015 | Ando et al. | |

FOREIGN PATENT DOCUMENTS

| JP | 2007088737 A | 4/2007 |
| JP | 2012114702 A | 6/2012 |
| JP | 2015219822 A | 12/2015 |

* cited by examiner

Legend
A= Roadside communication unit

COMMUNICATION SYSTEM AND IN-VEHICLE COMMUNICATION APPARATUS

CROSS-REFERENCE TO RELATED APPLICATIONS

This application is the U.S. national stage of PCT/JP2017/023410 filed Jun. 26, 2017, which claims priority of Japanese Patent Application No. JP 2016-128028 filed Jun. 28, 2016.

TECHNICAL FIELD

The present disclosure relates to a communication system that communicates using electronic certificate information, and to an in-vehicle communication apparatus that is included in this communication system.

BACKGROUND

Vehicles in recent years are equipped with an in-vehicle communication apparatus having a wireless communication function such as road-vehicle communication for performing wireless communication with roadside communication apparatuses installed on the road and vehicle-vehicle communication for performing wireless communication with other vehicles, enabling various types of information exchange to be performed with apparatuses external to the vehicle. A high level of security is desired in communication external to the vehicle that is performed by the in-vehicle communication apparatus, and communication technologies such as electronic signatures and encryption are generally used.

JP 2013-58140A, for example, proposes a communication apparatus that generates a vehicle ID from the vehicle number of its own vehicle and transmits the vehicle ID in addition to transmission data, and that also generates a vehicle ID after acquiring the vehicle number of another vehicle with which communication is to be performed and determines the validity of data received from the other vehicle through comparison with the vehicle ID attached to the received data.

In the case of performing communication that utilizes electronic signatures, encryption or the like, it is effective to utilize an issuing system for electronic certificate information that is configured by one root certificate authority and a plurality of sub-certificate authorities, for example. In this system, the root certificate authority issues the certificate information of the sub-certificate authorities and the sub-certificate authorities issue the certificate information of the in-vehicle communication apparatus. The certificate information that is issued by the sub-certificate authorities includes the certificate information of the sub-certificate authorities, in addition to information generated for the in-vehicle communication apparatus. The in-vehicle communication apparatus attaches an electronic signature including its own public key information and certificate information issued by the sub-certificate authorities to data to be transmitted by the in-vehicle communication apparatus. Another communication apparatus that receives this data is able to determine the validity of the received data, by determining the validity of the certificate information of the in-vehicle communication apparatus that transmitted the data, which is included in the electronic signature attached to the received data, and the validity of the certificate information of the sub-certificate authority that issued this certificate information.

It is not desirable from the point of view of security that one certificate information is used continuously over a long time period. As a result, certificate information often has a period of validity set therein and certificate information for which the period of validity has expired is often treated as invalid. The communication apparatus in this case requires that new certificate information is acquired when the period of validity of its own certificate information has expired or when the period of validity is about to expire. However, there is a problem that it is difficult for a conventional in-vehicle communication apparatus mounted in a vehicle to acquire new certificate information.

The present disclosure was made in view of these circumstances and an object thereof is to provide a communication system in which an in-vehicle communication apparatus mounted in a vehicle is capable of acquiring certificate information, and to provide an in-vehicle communication apparatus that is included in this communication system.

SUMMARY

A communication system according to the present disclosure is provided with an in-vehicle communication apparatus mounted in a vehicle, and a server apparatus that creates electronic certificate information to be used in communication by the in-vehicle communication apparatus, wherein the communication system is further provided with a roadside communication apparatus that is installed on a road and that communicates wirelessly with the in-vehicle communication apparatus and communicates with the server apparatus, and the in-vehicle communication apparatus includes: a wireless communication unit that communicates wirelessly with the roadside communication apparatus; a request processing unit that makes a request for the creation of certificate information to the server apparatus via the roadside communication apparatus; an inquiry processing unit that makes an inquiry about the creation status of the certificate information the creation of which was requested to the server apparatus via the roadside communication apparatus; and a certificate information acquisition processing unit that acquires the certificate information from the server apparatus via the roadside communication apparatus.

Also, the communication system according to the present disclosure is configured such that the server apparatus includes a creation processing unit that creates certificate information in response to the request from the in-vehicle communication apparatus, and a response processing unit that makes a response with regard to the creation status of the requested certificate information, in response to the inquiry from the in-vehicle communication apparatus, and the response processing unit transmits the created certificate information together with the response to the in-vehicle communication apparatus when the certificate information pertaining to the inquiry has been created, and the certificate information acquisition processing unit of the in-vehicle communication apparatus acquires the certificate information transmitted together with the response from the server apparatus.

Also, the communication system according to the present disclosure is configured such that the in-vehicle communication apparatus has a key generation processing unit that generates a set of a private key and a public key, the request processing unit of the in-vehicle communication apparatus transmits the public key, which is generated by the key generation processing unit, together with the creation request for the certificate information, to the server apparatus, and the creation processing unit of the server apparatus creates the certificate information on the basis of the public key provided by the in-vehicle communication apparatus.

Also, the communication system according to the present disclosure is configured such that the request processing unit of the in-vehicle communication apparatus transmits the acquired certificate information when requesting the creation of a new certificate information to the server apparatus, and the creation processing unit of the server apparatus creates new certificate information when the certificate information provided by the in-vehicle communication apparatus is valid.

Also, the communication system according to the present disclosure is configured such that a period of validity is set in the certificate information, and the request processing unit of the in-vehicle communication apparatus makes a request, to the server apparatus, for the creation of new certificate information before the period of validity of the acquired certificate information has expired.

Also, the communication system according to the present disclosure is configured such that in-vehicle communication apparatus has a storage unit that stores information for acquiring certificate information having a limited usage count, and, in a case in which the period of validity of the acquired certificate information has expired, the request processing unit of the in-vehicle communication apparatus transmits the information for acquiring certificate information stored in the storage unit instead of the acquired certificate information when making a request for the creation of a new certificate information to the server apparatus, and the creation processing unit of the server apparatus creates the new certificate information when the information for acquiring certificate information provided by the in-vehicle communication apparatus is valid.

Also, the communication system according to the present disclosure is configured such that the inquiry processing unit of the in-vehicle communication apparatus periodically makes inquiries to the server apparatus.

Also, the communication system according to the present disclosure is configured such that the in-vehicle communication apparatus has a position information acquisition processing unit that acquires position information of the vehicle, and the inquiry processing unit of the in-vehicle communication apparatus makes an inquiry to the server apparatus in accordance with the position information acquired by the position information acquisition processing unit.

Also, the communication system according to the present disclosure is configured such that the in-vehicle communication apparatus includes a relay function determination unit that communicates wirelessly with the roadside communication apparatus, using the wireless communication unit, and determines whether the roadside communication apparatus has a function for relaying communication with the server apparatus.

Also, an in-vehicle communication apparatus according to the present disclosure is mounted in a vehicle and communicates using electronic certificate information created by a server apparatus, wherein the in-vehicle communication apparatus is further provided with: a wireless communication unit that communicates wirelessly with a roadside communication apparatus installed on a road; a request processing unit that makes a request for the creation of certificate information to the server apparatus through the roadside communication apparatus; an inquiry processing unit that makes an inquiry about the creation status of certificate information the creation of which was requested to the server apparatus through the roadside communication apparatus; and a certificate information acquisition processing unit that acquires certificate information from the server apparatus through the roadside communication apparatus.

According to the present disclosure, the in-vehicle communication apparatus mounted in a vehicle communicates, through the roadside communication apparatus installed on a road, with the server apparatus that creates electronic certificate information, and acquires certificate information from the server apparatus. At this time the in-vehicle communication apparatus first makes the request to the server apparatus to create the certificate information, and the server apparatus creates the certificate information in response to the request. Because the processing for creating certificate information is complex and the server apparatus receives creation requests from multiple in-vehicle communication apparatuses, the server apparatus does not necessarily create the certificate information promptly in response to the request from the in-vehicle communication apparatus. Accordingly, the in-vehicle communication apparatus makes an inquiry to the server apparatus regarding the creation status of the certificate information after the making the creation request for the certificate information. The server apparatus that receives the inquiry issues a response indicating whether or not the creation of the requested certificate information has been completed, and if the creation of the certificate information has been completed, the server apparatus transmits the created certificate information to the in-vehicle communication apparatus together with the response. When the in-vehicle communication apparatus receives the response indicating that the creation of the certificate information has not been completed, the in-vehicle communication apparatus is able to, for example, make the inquiry again after a short while. When the in-vehicle communication apparatus receives the response indicating that the creation of the certificate information has been completed, the in-vehicle communication apparatus acquires the certificate information transmitted by the server apparatus together with the response. As a result, the in-vehicle communication apparatus is able to communicate with the server apparatus through the roadside communication apparatus and acquire the certificate information when the vehicle has entered a wireless communication region with the roadside communication apparatus while the vehicle is traveling and the like.

Also, the in-vehicle communication apparatus generates a set of a private key and a public key in the present disclosure. The private key is used for encrypting information and the public key is used for decrypting the encrypted information. The in-vehicle communication apparatus transmits the generated public key to the server apparatus together with the creation request of the certificate information. As a result, the server apparatus is able to create certificate information that includes the information of the public key. When the server apparatus is configured to generate the private key and the public key, there is a need to transmit a private key from the server apparatus to the in-vehicle communication apparatus and there is a concern that the leakage of information may occur while transmitting and receiving the private key. However, the leakage of the private key can be prevented due to the configuration in which the in-vehicle communication apparatus generates the keys.

Also, the in-vehicle communication apparatus transmits the acquired certificate information to the server apparatus when the in-vehicle communication apparatus makes the creation request for the certificate information to the server apparatus in the present disclosure. When the certificate information received together with the creation request is valid, the server apparatus that receives the creation request creates new certificate information. As a result, the credibility of the creation request made by the in-vehicle communication apparatus to the server apparatus is improved.

Also, a period of validity is set in the certificate information created by the server apparatus and the in-vehicle communication apparatus makes the request to the server apparatus to create new certificate information before the period of validity of the certificate information held by the in-vehicle communication apparatus expires. As a result, the certificate information within the period of validity is used and the in-vehicle communication apparatus is able to make the creation request to the server apparatus.

For example, there is a possibility that a state in which the in-vehicle communication apparatus is not able to communicate with the server apparatus may continue over a long period and the period of validity of the certificate information may expire within this period. The in-vehicle communication apparatus in this case may not be able to make the request to the server apparatus for creating a new certificate information using the certificate information held by the in-vehicle communication apparatus.

Accordingly, the in-vehicle communication apparatus stores the information for acquiring certificate information that has a limited usage count in the storage unit in the present disclosure. The information for acquiring certificate information, for example, may be information that can be used only one time or multiple times and may be erased from the storage unit after a predetermined number of usages. When the period of validity of the certificate information held by the in-vehicle communication apparatus has expired, the in-vehicle communication apparatus makes a request for the creation of new certificate information by transmitting the information for acquiring certificate information stored in the storage unit to the server apparatus. The server apparatus creates the new certificate information when the information for acquiring certificate information provided by the in-vehicle communication apparatus is valid. As a result, the case of a loss of communication with an apparatus external to the vehicle due to the period of validity of the certificate information becoming expired can be prevented in an in-vehicle communication apparatus which is not always able to constantly communicate with the server apparatus.

Also, the in-vehicle communication apparatus makes an inquiry about the creation status of the certificate information to the server apparatus periodically in a predetermined cycle such as, for example, every few minutes, every several tens of minutes, or every few hours, in the present disclosure.

Also, the in-vehicle communication apparatus acquires position information of the vehicle using a global positioning system (GPS) and the like in the present disclosure. The in-vehicle communication apparatus makes the inquiry about the creation status of the certificate information to the server apparatus each time, for example, the in-vehicle communication apparatus travels a certain distance or when the in-vehicle communication apparatus approaches a location where a roadside communication apparatus is installed, in response to the position information of the vehicle.

Consequently, the in-vehicle communication apparatus is able to reliably acquire the certificate information.

Also, the in-vehicle communication apparatus communicates with the roadside communication apparatus and thereby determines whether the roadside communication apparatus has a function for relaying communication with the server apparatus in the present disclosure. As a result, the in-vehicle communication apparatus is able to effectively and reliably communicate with the server apparatus in accordance with the functions of the roadside communication apparatus.

In the case of the present disclosure, it becomes possible for an in-vehicle communication apparatus mounted in a vehicle to acquire certificate information from a server apparatus by adopting a configuration in which the in-vehicle communication apparatus acquires electronic certificate information to be used in communication with another apparatus, from the server apparatus through a roadside communication apparatus.

DETAILED DESCRIPTION OF PREFERRED EMBODIMENTS

Outline of Communication System

Figure 1:
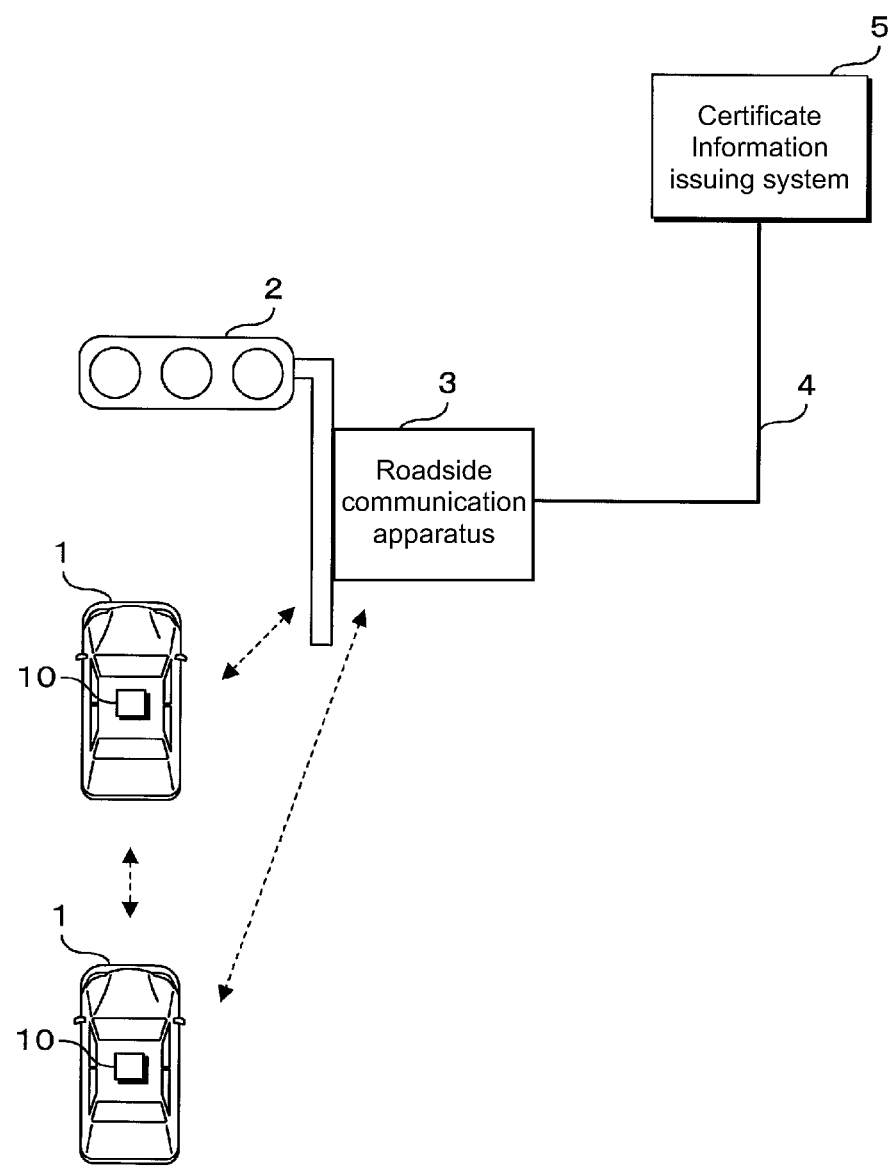
FIG. 1 is a schematic diagram showing an exemplary configuration of a communication system according to an embodiment.

FIG. 1 is a schematic diagram showing the configuration of a communication system according to the present embodiment. In the communication system according to the present embodiment, an in-vehicle communication apparatus 10 mounted in a vehicle 1 is able to perform wireless communication with an in-vehicle communication apparatus 10 mounted in another vehicle 1, that is, so-called vehicle-vehicle communication. Also, the in-vehicle communication apparatus 10 is able to perform wireless communication with a roadside communication apparatus 3 installed in a traffic light 2 on the road, that is, so-called road-vehicle communication. The in-vehicle communication apparatus 10, in the case of transmitting data to another apparatus by communication such as vehicle-vehicle communication or road-vehicle communication, transmits transmission data to the other apparatus with an electronic signature attached thereto, in order to prevent spoofing, data tampering or the like by a malicious third party. The apparatus, having received the data, determines the validity of the received data, based on the electronic signature attached to the received data.

The roadside communication apparatus 3 has a function of performing communication with a server apparatus and the like via a network 4 such as the Internet. Also, the roadside communication apparatus 3 according to the present embodiment has a function of relaying communication between the in-vehicle communication apparatus 10 of the vehicle 1 and the server apparatus and the like connected to the network 4. The in-vehicle communication apparatus 10 is thereby able to communicate, via the roadside communication apparatus 3, with a certificate information issuing system 5 connected to the network 4.

The communication system according to the present embodiment performs communication utilizing so-called public-key encryption technology. The in-vehicle communication apparatus 10 thus has a private key for encrypting data to be transmitted or a hash value of this data, and a public key for decrypting encrypted data. The in-vehicle communication apparatus 10 wirelessly transmits transmission data to another in-vehicle communication apparatus 10, the roadside communication apparatus 3 or the like with an electronic signature that includes encrypted data encrypted using a private key, a public key for decrypting this encrypted data, and electronic certificate information certifying that this public key is valid attached thereto.

The electronic certificate information that is needed at this time is issued to each in-vehicle communication apparatus 10 by the certificate information issuing system 5. The in-vehicle communication apparatus 10 stores the electronic certificate information issued by the certificate information issuing system 5, and uses the stored electronic certificate information whenever data transmission is performed. A period of validity is, however, set for electronic certificate information that is issued by the certificate information issuing system 5, and the in-vehicle communication apparatus 10 needs to make a request to the certificate information issuing system 5 for issuance of electronic certificate information and acquire the new electronic certificate information, either before the period of validity expires or after the period of validity has expired. In the communication system according to the present embodiment, the request for issuance of certificate information from the in-vehicle communication apparatus 10 to the certificate information issuing system 5 and the transmission of the electronic certificate information from the certificate information issuing system 5 to the in-vehicle communication apparatus 10 can be performed via the roadside communication apparatus 3.

The certificate information issuing system 5 is formed in a tree configuration configured by a root certificate authority and a plurality of sub-certificate authorities. One sub-certificate authority issues electronic certificate information to the in-vehicle communication apparatus 10 of each vehicle 1.

Figure 2:
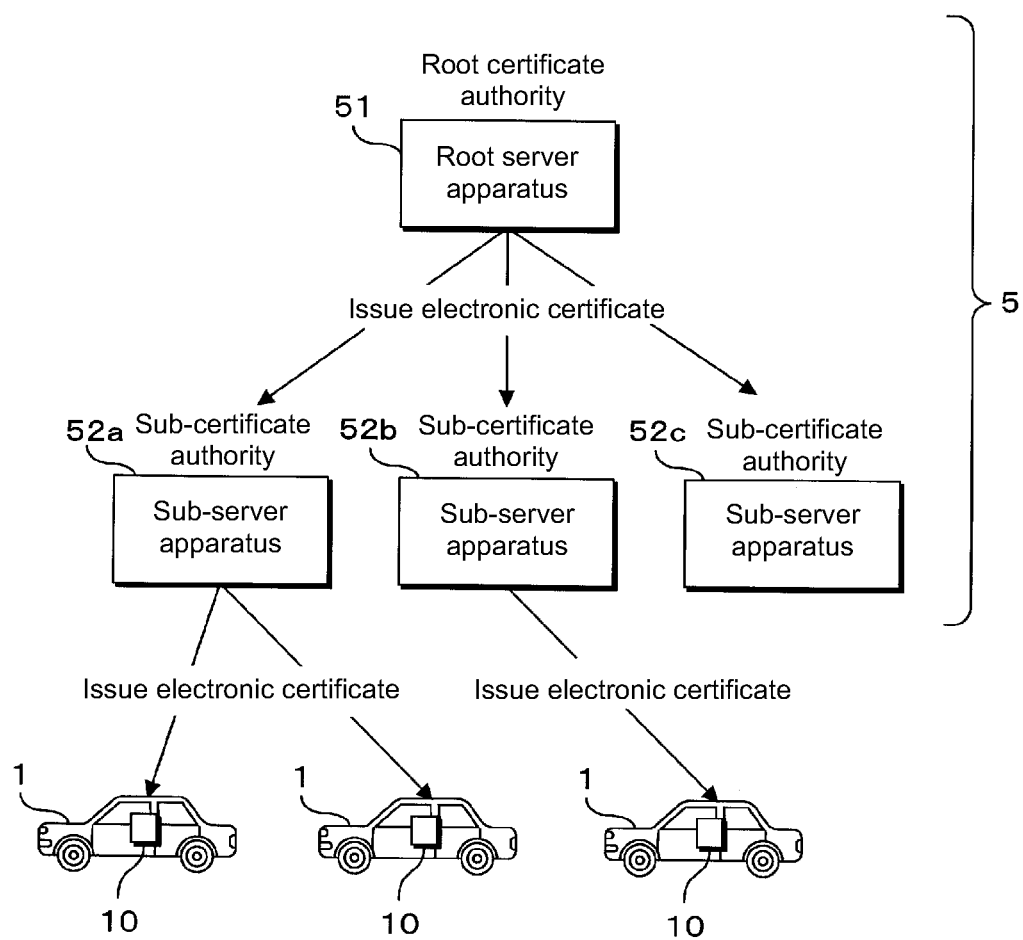
FIG. 2 is a schematic diagram showing an exemplary configuration of a certificate information issuing system.

FIG. 2 is a schematic diagram showing an exemplary configuration of the certificate information issuing system 5. The certificate information issuing system 5 according to the present embodiment is configured to include one root certificate authority and three sub-certificate authorities. The certificate information issuing system 5 is a tree configuration in which the root certificate authority is set at a higher level, and the three sub-certificate authorities are each connected to the root certificate authority. The root certificate authority is realized by a root server apparatus 51, and the three sub-certificate authorities are respectively realized by sub-server apparatuses 52a to 52c. Each of these server apparatuses need not be a standalone apparatus, and may be realized through the collaboration of a plurality of apparatuses. Also, for example, a plurality of server apparatuses may in actuality be realized by a single apparatus, such as the sub-server apparatuses 52a and 52b in actuality being realized by a single apparatus. Also, these server apparatuses need not be arranged proximally, and the server apparatuses may be arranged remotely as long as information can be mutually exchanged via a network such as the Internet. Note that, in the following, the root server apparatus 51 that realizes the root certificate authority is simply referred to as the root certificate authority 51, and the sub-server apparatuses 52a to 52c that realize the sub-certificate authorities are simply referred to as the sub-certificate authorities 52a to 52c.

The root certificate authority 51 authenticates the sub-certificate authorities 52a to 52c. That is, the root certificate authority 51 performs processing for issuing certificate information certifying the validity of the public keys of the sub-certificate authorities 52a to 52c. The sub-certificate authorities 52a to 52c authenticate the in-vehicle communication apparatus 10 of the vehicle 1. That is, the sub-certificate authorities 52a to 52c perform processing for issuing certificate information certifying the validity of the public key of each in-vehicle communication apparatus 10. The certificate information of the in-vehicle communication apparatus 10 that is issued by the sub-certificate authorities 52a to 52c includes the certificate information of the sub-certificate authorities 52a to 52c that is issued by the root certificate authority 51. The in-vehicle communication apparatus 10, having acquired certificate information from the sub-certificate authorities 52a to 52c or having acquired certificate information attached to received data, is thereby able to determine whether the acquired certificate information was issued by valid sub-certificate authorities 52a to 52c, by determining the validity of the certificate information of the sub-certificate authorities 52a to 52c that is included in the acquired certificate information.

System Configuration

Figure 3:
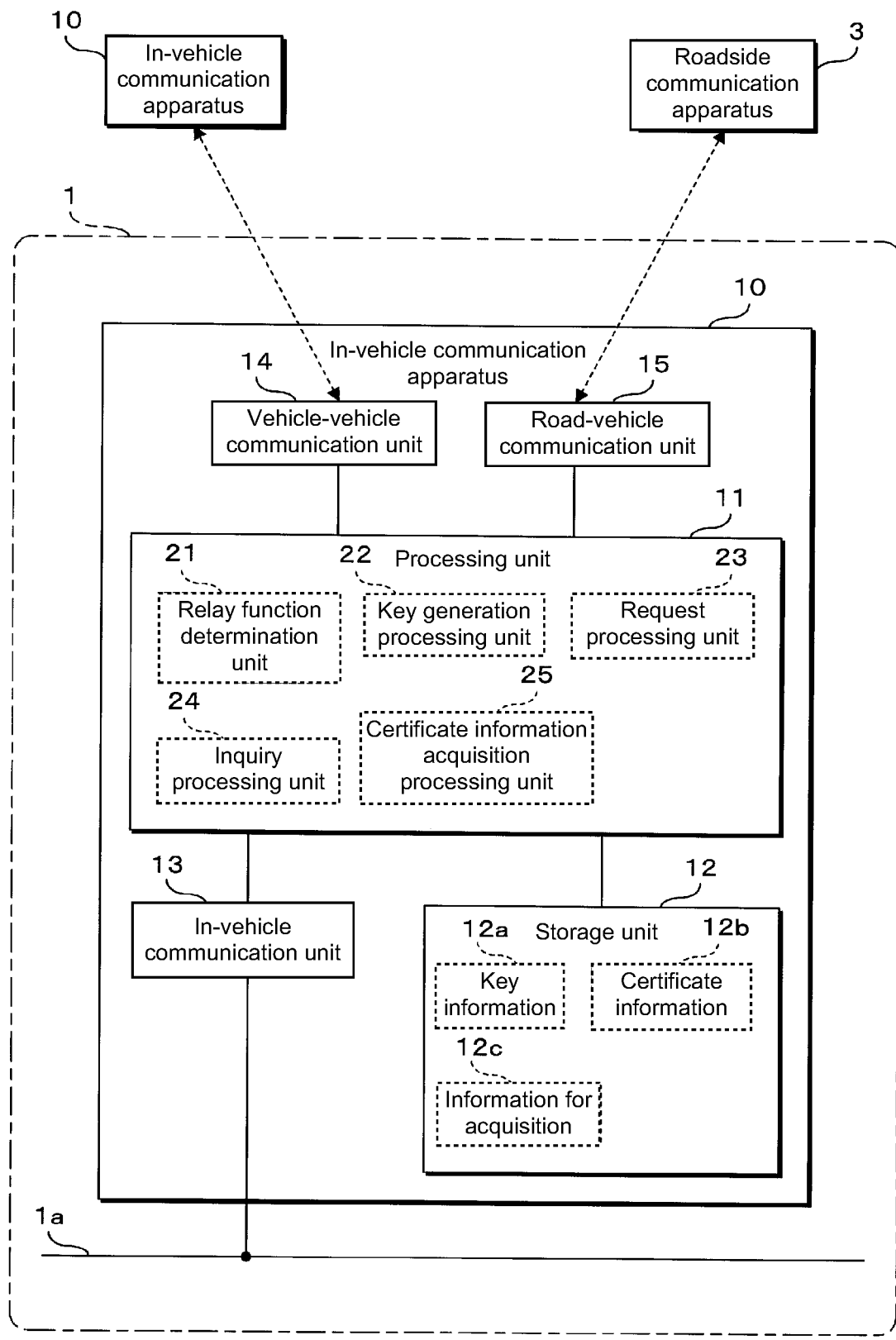
FIG. 3 is a block diagram showing the configuration of an in-vehicle communication apparatus.

FIG. 3 is a block diagram showing the configuration of the in-vehicle communication apparatus 10. The in-vehicle communication apparatus 10 that is mounted in the vehicle 1 is configured to be provided with a processing unit 11, a storage unit 12, an internal communication unit 13, a vehicle-vehicle communication unit 14, a road-vehicle communication unit 15 and the like. The processing unit 11 is configured using a computational processing unit such as a CPU (central processing unit) or an MPU (micro-processing unit), and performs various types of computational processing related to communication, by reading out and executing programs stored in the storage unit 12 or a ROM (read-only memory) which is not illustrated.

The storage unit 12 is configured using a nonvolatile memory device such as an EEPROM (electrically erasable programmable read-only memory) or a flash memory, for example. The storage unit 12 stores programs that are executed by the processing unit 11, various types of data that are used in processing by the processing unit 11, and the like, for example. In the present embodiment, the storage unit 12 stores key information 12a, certificate information 12b, and information for acquisition 12c. The key information 12a includes information on the private key and public key of the in-vehicle communication apparatus 10 itself that are required in communication. The certificate information 12b is certificate information issued by the certificate information issuing system 5, and is certificate information certifying the validity of the public key of the key information 12a. The information for acquisition 12c is information used for acquiring new certificate information when the period of validity of the certificate information 12b stored in the storage unit 12 has expired and cannot be used.

The number of times that the information for acquisition 12c can be used as information is limited to one time, a number of times or the like, and is erased from the storage unit 12 after being used the limited number of times. The information for acquisition 12c is written to the storage unit 12, for example, during a manufacturing stage or the like of the in-vehicle communication apparatus 10, or written to the storage unit 12, for example, by a dealer or the like of the vehicle 1 when the information for acquisition 12c is erased after being used a predetermined number of times. Note that a plurality of sets of the information for acquisition 12c may be stored in the storage unit 12. For example, ten sets of the information for acquisition 12c for which the number of usages is limited to only one may be stored, whereby it is possible to acquire new certificate information 12b ten times when the period of validity of the certificate information 12b has expired.

The internal communication unit 13 communicates with other in-vehicle apparatuses mounted in the vehicle 1 (e.g., body ECU (electronic control unit), car navigation apparatus, etc.), via an internal network 1a such as a CAN (controller area network) provided within the vehicle 1. The internal communication unit 13 performs data transmission by converting data for transmission provided by the processing unit 11 into an electrical signal and outputting the electrical signal to a communication line that configures the internal network 1a, and also receives data by sampling and acquiring a potential of the communication line and provides the received data to the processing unit 11.

The vehicle-vehicle communication unit 14 communicates wirelessly with the in-vehicle communication apparatus 10 mounted in other vehicles 1. The vehicle-vehicle communication unit 14 performs data transmission to other in-vehicle communication apparatuses 10 by outputting a signal obtained through modulating data for transmission provided by the processing unit 11 from an antenna, and also receives data from other in-vehicle communication apparatuses 10 by demodulating signals received with the antenna and provides the received data to the processing unit 11. Note that an electronic signature generated using the key information 12a and the certificate information 12b stored in the storage unit 12 is attached to data that is transmitted by the vehicle-vehicle communication unit 14.

The road-vehicle communication unit 15 communicates wirelessly with the roadside communication apparatus 3 provided on the road. The road-vehicle communication unit 15 performs data transmission to the roadside communication apparatus 3 by outputting a signal obtained through modulating data for transmission provided by the processing unit 11 from the antenna, and also receives data from the roadside communication apparatus 3 by demodulating signals received with the antenna and provides the received data to the processing unit 11. Note that an electronic signature generated using the key information 12a and the certificate information 12b stored in the storage unit 12 is attached to data that is transmitted by the road-vehicle communication unit 15.

Also, in the processing unit 11 of the in-vehicle communication apparatus 10 according to the present embodiment, a relay function determination unit 21, a key generation processing unit 22, a request processing unit 23, an inquiry processing unit 24, a certificate information acquisition processing unit 25 and the like are realized as software-based functional blocks, by executing programs stored in the storage unit 12, the ROM or the like. The relay function determination unit 23 performs processing for determining whether the roadside communication apparatus 3 with which road-vehicle communication was performed by the road-vehicle communication unit 15 has a function of relaying communication between the in-vehicle communication apparatus 10 and the certificate information issuing system 5 and the like connected to the network 4. For example, the roadside communication apparatus 3 transmits list information of its own functions, periodically or continuously, or in response to an inquiry from the in-vehicle communication apparatus 10. The relay function determination unit 23 is able to determine whether the roadside communication apparatus 3 has a function of relaying communication, by receiving the function list information transmitted from the roadside communication apparatus 3, and determining whether a communication relay function is included in this information.

The key generation processing unit 22 performs processing for generating a private key for performing processing for encrypting data that will be transmitted outside of the vehicle 1 by the in-vehicle communication apparatus 10, and a public key for performing processing for decrypting data encrypted using this private key. Since the method of generating the private key and public key is existing technology, a detailed description is omitted. The key generation processing unit 22 stores a generated set of the private key and the public key as the key information 12a in the storage unit 12.

The request processing unit 23 performs processing to utilize the road-vehicle communication with the roadside communication apparatus performed by the road-vehicle communication unit 15 to communicate with any of the sub-certificate authorities 52a to 52c of the certificate information issuing system 5 via the roadside communication apparatus 3 and make a request for the creation of the certificate information to the sub-certificate authorities 52a to 52c. The request processing unit 23 at this time transmits the certificate information 12b stored in the storage unit 12 and the private key generated by the key generation processing unit 22 to the sub-certificate authorities 52a to 52c and makes a request for the creation of the certificate information. Also, a period of validity is set in the certificate information 12b stored in the storage unit 12, and the request processing unit 23 makes a request for the creation of a new certificate information to the sub-certificate authorities 52a to 52c before the period of validity set in the certificate information 12b stored in the storage unit 12 has expired. However, when the period of validity of the certificate information 12b stored in the storage unit 12 has expired because the vehicle 1 has been parked for a long period outside of the communication range with the roadside communication apparatus 3 or the like, the request processing unit 23 substitutes the information for acquisition 12c stored in the storage unit 12 for the certificate information and sends the data to the sub-certificate authorities 52a to 52c.

After the request processing unit 23 has made a request for the creation of the certificate information, the inquiry processing unit 24 performs processing for communicating with the sub-certificate authorities 52a to 52c to which the creation has been requested, via the roadside communication apparatus 3, and makes and inquiry about the creation status of the certificate information the creation of which has been requested, to these sub-certificate authorities 52a to 52c. The inquiry processing unit 24 repeats making the inquiry to the sub-certificate authorities 52a to 52c periodically at a predetermined cycle such as, for example, every few minutes, every several tens of minutes, every few hours or the like until the acquisition of the certificate information the creation of which has been requested. The sub-certificate authorities 52a to 52c that receive the inquiry from the inquiry processing unit 24 make a response indicating the creation status of the certificate information related to the inquiry, that is, whether the creation has been completed or not, to the in-vehicle communication apparatus 10 that is the source of the inquiry. The sub-certificate authorities 52a to 52c at this time transmit the created certificate information together with the response when the creation of the certificate information has been completed. The certificate information acquisition processing unit 25 of the in-vehicle communication apparatus 10 acquires the certificate information and stores the certificate information in the storage unit 12 when the created certificate information transmitted together with the response is received from the sub-certificate authorities 52a to 52c.

Figure 4:
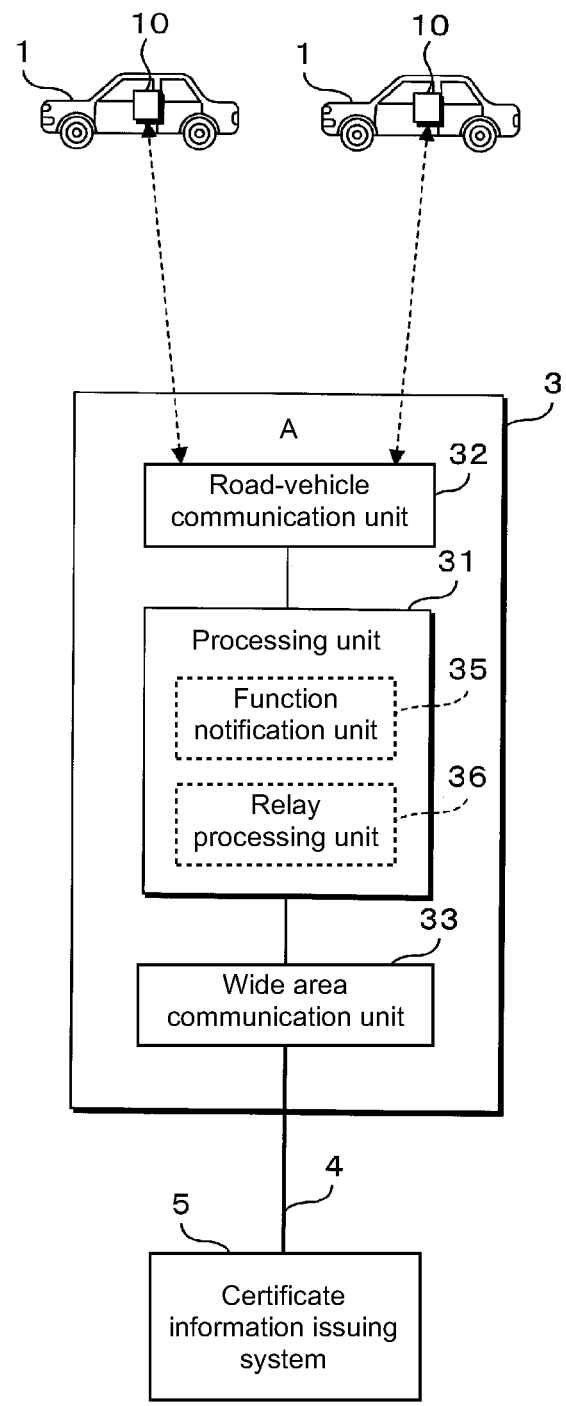
FIG. 4 is a block diagram showing the configuration of a roadside communication apparatus.

FIG. 4 is a block diagram showing the configuration of the roadside communication apparatus 3. The roadside communication apparatus 3 according to the present embodiment is configured to be provided with a processing unit 31, a road-vehicle communication unit 32, a wide area communication unit 33 and the like. The processing unit 31 is configured using a computational processing unit such as a CPU, and performs various types of computational processing related to communication. The road-vehicle communication unit 32 communicates wirelessly with the in-vehicle communication apparatus 10 mounted in the vehicle 1. The road-vehicle communication unit 32 performs data transmission to the in-vehicle communication apparatus 10 by outputting a signal obtained through modulating data for transmission provided by the processing unit 31 from an antenna, and also receives data from the in-vehicle communication apparatus 10 by demodulating signals received with the antenna and provides the received data to the processing unit 31. The wide area communication unit 33 communicates with a server apparatus or the certificate information issuing system 5 described above, and the like, via the network 4 such as the Internet. The wide area communication unit 33 transmits data for transmission provided by the processing unit 31 to the server apparatus and the like connected to the network 4, and also receives data transmitted from a server apparatus and the like and provides the received data to the processing unit 31.

Also, the processing unit 11 of the roadside communication apparatus 3 according to the present embodiment is provided with functional blocks such as a function notification unit 35 and a relay processing unit 36. The function notification unit 35 performs processing for transmitting, by road-vehicle communication, list information of the functions that the roadside communication apparatus 3 can provide to the vehicle 1, in response to an inquiry from the vehicle 1. The functions that can be provided by the roadside communication apparatus 3 can include, for example, a function of informing the operating status of the traffic light 2 and a function of informing traffic information such as the road congestion status. Also, in the present embodiment, the roadside communication apparatus 3 has a relay function of relaying communication between the in-vehicle communication apparatus 10 and the certificate information issuing system 5. The relay processing unit 36 performs processing for transmitting data received from the in-vehicle communication apparatus 10 with the road-vehicle communication unit 32 to the certificate information issuing system 5 with the wide area communication unit 33. Also, the relay processing unit 36 performs processing for transmitting data received from the certificate information issuing system 5 with the wide area communication unit 33 to the in-vehicle communication apparatus 10 with the road-vehicle communication unit 32.

Figure 5:
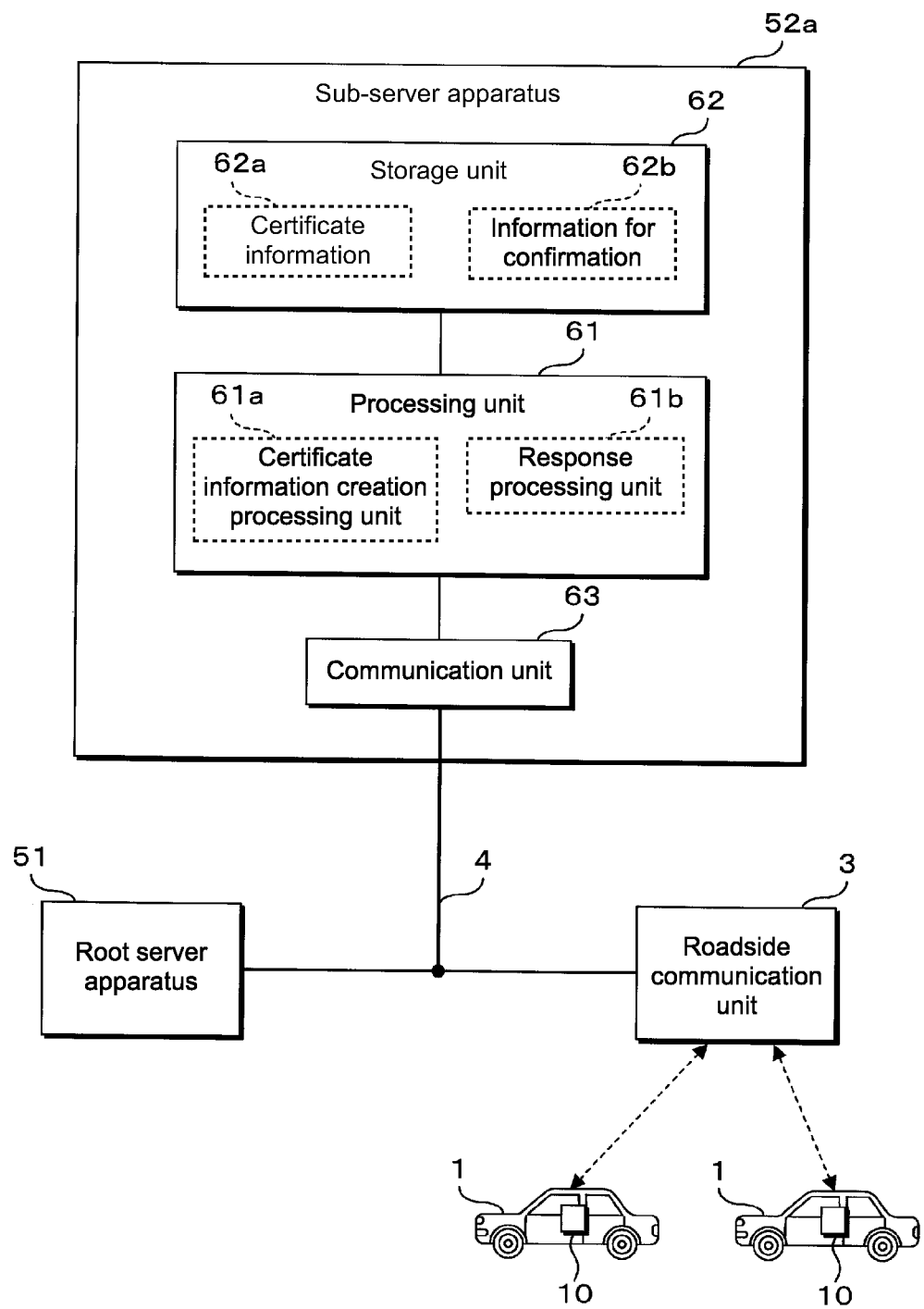
FIG. 5 is a block diagram showing the configuration of a sub-server apparatus.

FIG. 5 is a block diagram showing the configuration of the sub-server apparatus 52a. Note that the other sub-server apparatuses 52b and 52c are configured in the same way and thus the illustration and explanation thereof are omitted. The sub-server apparatus 52a according to the present embodiment is configured to be provided with a processing unit 61, a storage unit 62, a communication unit 63, and the like. The processing unit 61 is configured using a computational processing unit such as a CPU, and performs various types of computational processing related to the creation of the certificate information, by executing programs stored in the storage unit 62.

The storage unit 62 is configured using a storage device such as a hard disk, for example, and stores programs that are executed by the processing unit 61 and various types of data required in processing by the processing unit 61. In the present embodiment, the storage unit 62 stores its own certificate information 62a and information for confirmation 62b for confirming the validity of the information for acquisition 12c of the in-vehicle communication apparatus 10. The certificate information 62a is created by the root server apparatus 51 that is the root certificate authority for the sub-server apparatus 52a. The information for confirmation 62b can be set, for example, as information having the same value as the information for acquisition 12c stored in the in-vehicle communication apparatus 10. In this case, the sub-server apparatus 52b is able to determine whether the received information for acquisition 12c is valid in response to whether or not the information for acquisition 12c received from the in-vehicle communication apparatus 10 matches its own information for confirmation 62b stored in storage unit 62. Note that a plurality of the in-vehicle communication apparatuses 10 that can communicate with the sub-server apparatus 52a are present, and the pieces of information for confirmation 62b stored by each of the in-vehicle communication apparatuses 10 are different values. The sub-server apparatus 52a therefore stores a plurality of values as the pieces of information for confirmation 62b in the storage unit 62, and reads out one of the pieces of information for confirmation 62b corresponding to the information for acquisition 12c received from the in-vehicle communication apparatus 10 and determines the validity of the information for acquisition 12c. The information for confirmation 62b may be created by the sub-server apparatus 52a, for example, or may be created by an administrator or the like of the system, for example, or an item created by another device, for example, may be acquired via the network 4.

The communication unit 63 communicates with the roadside communication apparatus 3, the certificate information issuing system 5 and the like, via the network 4 such as the Internet. The communication unit 63 transmits data for transmission provided by the processing unit 61 to the roadside communication apparatus 3, the certificate information issuing system 5 and the like connected to the network 4, and also receives data from the roadside communication apparatus 3, the certificate information issuing system 5 and the like and provides the received data to the processing unit 61.

Also, in the processing unit 61 of an update information distribution server apparatus 52a according to the present embodiment, a certificate information creation processing unit 61a, a response processing unit 61b and the like are realized as a software functional block by the execution of programs stored in the storage unit 62. The certificate information creation processing unit 61a performs processing for creating the certificate information in response to a request from an in-vehicle communication apparatus 10. The certificate information creation processing unit 61a creates the certificate information for the in-vehicle communication apparatus 10 on the basis of the public key provided together with the request from the in-vehicle communication apparatus 10, its own certificate information 62a stored in the storage unit 62, and the like.

The response processing unit 61b performs processing for making a response regarding the creation status of the certificate information the creation of which has been requested, in response to an inquiry from the in-vehicle communication apparatus 10. The response processing unit 61b makes the response regarding information indicating whether the creation of the certificate information has been completed or not by transmitting the response to the in-vehicle communication apparatus 10 that is the source of the inquiry. Note that when the creation of the certificate information is not completed, the response processing unit 61b may transmit a response indicating that the creation has not been completed together with information such as, for example, the expected date and time that the creation will completed, to the in-vehicle communication apparatus 10. Also, when the creation of the certificate information has been completed, the response processing unit 61b may transmit a response indicating the completion together with the created certificate information to the in-vehicle communication apparatus 10.

Certificate Information Updating Processing

Figure 6:
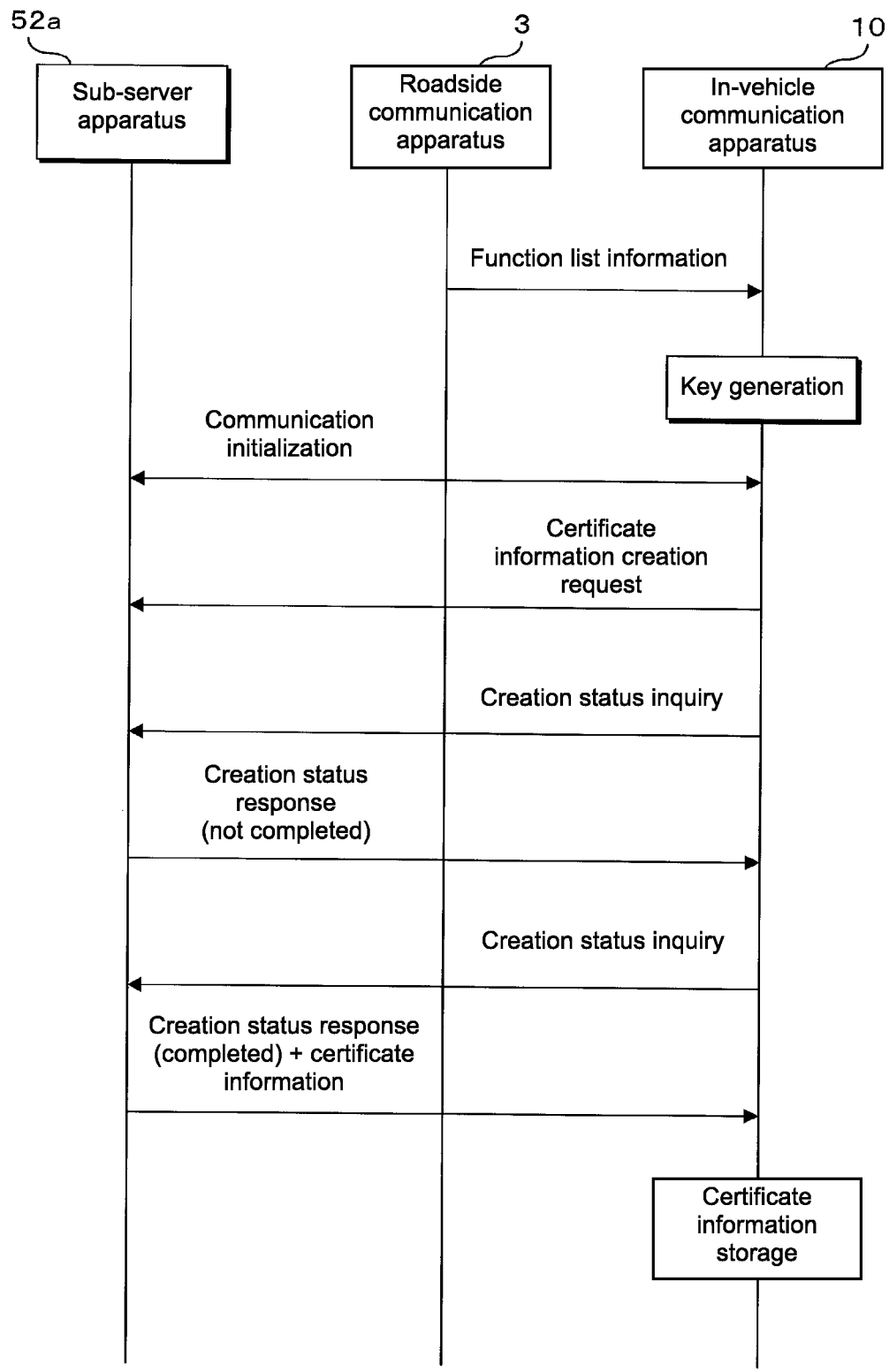
FIG. 6 is a timing chart for illustrating processing for updating certificate information of the in-vehicle communication apparatus.

FIG. 6 is a timing chart for illustrating processing for updating the certificate information of the in-vehicle communication apparatus 10. The roadside communication apparatus 3 continuously and repeatedly transmits list information of the functions that it can provide, for example. If the in-vehicle communication apparatus 10 enters the communication range of the roadside communication apparatus 3 due to the vehicle 1 traveling, the in-vehicle communication apparatus 10 is able to receive, with the road-vehicle communication unit 15, the function list information that is transmitted by the roadside communication apparatus 3. The in-vehicle communication apparatus 10, having received the function list information from the roadside communication apparatus 3, determines whether this roadside communication apparatus 3 has a relay function. If the roadside communication apparatus 3 has a relay function, the in-vehicle communication apparatus 10 generates a set of the private key and the public key, utilizes the relay function of the roadside communication apparatus 3, and starts communication with the sub-serve apparatus 52a via the roadside communication apparatus 3. At this time, the in-vehicle communication apparatus 10 first performs communication initialization processing such as establishing a communication session or authentication processing, for example, with the sub-server apparatus 52a.

After ending the communication initialization processing, the in-vehicle communication apparatus 10 makes a request to the sub-server apparatus 52a for the creation of new certificate information. The sub-server apparatus 52a that receives this request creates the certificate information on the basis of the information such as an encryption key of the in-vehicle communication apparatus 10 provided with the request. However, the sub-server apparatus 52a is requested to create certificate information from a plurality of in-vehicle communication apparatuses 10. The sub-server apparatus 52a therefore creates the certificate information successively in the requested order, for example. That is, when the sub-server apparatus 52a receives another creation request for the certificate information while creating a certain certificate information, the sub-server apparatus 52a accumulates the creation requests in a first in first out (FIFO) queue, for example, and after the creation of the certificate information being created is completed, acquires the next creation request from the queue and successively creates the certificate information. As a result, the in-vehicle communication apparatus 10 may not be able to acquire the certificate information immediately after making the creation request to the sub-server apparatus 52a.

After making the creation request for the certificate information, the in-vehicle communication apparatus 10 makes an inquiry about the creation information of the certificate information that was requested to the sub-server apparatus 52a, periodically at a predetermined cycle such as every few minutes, every several tens of minutes, every few hours or the like, for example. The sub-server apparatus 52a, in response to the inquiry, makes a response to the in-vehicle communication apparatus 10 that is the source of the inquiry, about the creation status of the certificate information related to the inquiry. If the creation of the certificate information is not completed, the sub-server apparatus 52a makes a response to the in-vehicle communication apparatus 10 indicating this fact. The in-vehicle communication apparatus 10 continues making the inquiry periodically when provided with the response indicating the non-completion.

If the creation of the certificate information is completed, the sub-server apparatus 52a makes a response indicating that the creation has been completed in response to the inquiry from the in-vehicle communication apparatus 10 and transmits the created certificate information to the in-vehicle communication apparatus 10. The in-vehicle communication apparatus 10 that has received the response indicating the completion of the creation stores the received certificate information together with the response in the storage unit 12.

Note that the in-vehicle communication apparatus 10 adds the certificate information 12b stored in the storage unit 12 to the message of the creation request or the inquiry and transmits the message to the sub-server apparatus 52a when making the creation request of the certificate information or the inquiry about the creation status to the sub-server apparatus 52a. The sub-server apparatus 52a that receives the creation request or inquiry determines the validity of the certificate information 12b received with the request or inquiry, and only when the certificate information 12b is determined to be valid, the sub-server apparatus 52a performs the processing corresponding to the creation request or the inquiry. Note that while the sub-server apparatus 52a determines the validity of the received certificate information 12b on the basis of the public key and information such as the period of validity included in the certificate information 12b, the processing for determining the validity of the certificate information is an existing technique and therefore a detailed explanation is omitted.

Also, the certificate information 62a of the sub-server apparatus 52a is included in the certificate information created by the sub-server apparatus 52a. When the in-vehicle communication apparatus 10 receives the certificate information from the sub-server apparatus 52a together with the response indicating the completion of the creation, the in-vehicle communication apparatus 10 determines whether the certificate information 62a of the sub-server apparatus 52a included in this certificate information is valid or not. Only when the certificate information 62a of the sub-server apparatus 52a is determined to be valid, the in-vehicle communication apparatus 10 updates the certificate information by erasing the certificate information 12b previously stored in the storage unit 12 and storing the newly received certificate information 12b in the storage unit 12.

In the communication system according to the present embodiment, the roadside communication apparatus 3 relays the communication between the in-vehicle communication apparatus 10 and the sub-server apparatus 52a. As a result, when the vehicle 1 is traveling or is parked outside of the communication range with the roadside communication apparatus 3, the in-vehicle communication apparatus 10 is not able to communicate with the sub-server apparatus 52a and is not able to acquire the certificate information from the sub-server apparatus 52a. When the status of not being able to communicate with the sub-server apparatus 52a has continued for a long period of time, there is a possibility that the period of validity of the certificate information 12b stored in the storage unit 12 by the in-vehicle communication apparatus 10 may expire. As indicated above, there is a need to attach and transmit the current certificate information with a creation request when making a request for the creation of new certificate information to the sub-server apparatus 52a, and a creation request having certificate information the period of validity of which has expired attached thereto is not accepted by the sub-server apparatus 52a, and the creation of new certificate information cannot be performed.

Accordingly, in the communication system according to the present embodiment, the in-vehicle communication apparatus 10 stores, in the storage unit 12, information for acquisition 12c that can be utilized only one time for acquiring new certificate information. When the period of validity of the certificate information 12b stored in the storage unit 12 has expired, the information for acquisition 12c is transmitted instead of the certificate information 12b to the sub-server apparatus 52a. The sub-server apparatus 52a that receives the creation request for certificate information having the information for acquisition 12c attached thereto uses the information for confirmation 62b stored in the storage unit 12 to determine the validity of the information for acquisition 12c. The information for acquisition 12c may be information that is a combination of a predetermined number of letters or numerical values and the like such as so-called one-time password. The information for acquisition 12c stored by the in-vehicle communication apparatus 10 and the information for confirmation 62b stored by the sub-server apparatus 52a may be, for example, the same information, or may be information that can be acquired when a predetermined operation is performed on the information for acquisition 12c and that is stored as the information for confirmation 62b, for example.

Note that while the present disclosure is configured such that the sub-server apparatus 52a transmits the created certificate information together with the response indicating the completion of the creation to the in-vehicle communication apparatus 10 in response to the inquiry from the in-vehicle communication apparatus 10 in the present embodiment, the present disclosure is not limited thereto. For example, the present disclosure may be configured so that the sub-server apparatus 52a transmits only the response indicating the completion of the creation, the in-vehicle communication apparatus 10 that receives this response transmits an acquisition request for the certificate information to the sub-server apparatus 52a, and the sub-server apparatus 52a transmits the certificate information to the in-vehicle communication apparatus 10 in response to the acquisition request.

Also, in the example shown in FIG. 6, a case is shown of processing performed by the in-vehicle communication apparatus 10 from the transmission of the creation request for the certificate information until the reception of the created certificate information while the vehicle 1 is present within the communication range of one roadside communication apparatus 3. Time may be needed in the case of the above certificate information from the creation request until the completion of the creation, and there is a possibility that the vehicle 1 may leave the communication range of the one roadside communication apparatus 3 before the acquisition of the certificate information. In this case, when the vehicle 1 enters the communication range of a subsequent roadside communication apparatus 3, the in-vehicle communication apparatus 10 acquires the function list information from the roadside communication apparatus 3 and determines whether the relay function can be utilized. After performing the necessary processing such as utilizing the relay function and performing communication initialization and the like with the sub-server apparatus 52a, the in-vehicle communication apparatus 10 may make the inquiry about the creation status of the certificate information.

Figure 7:
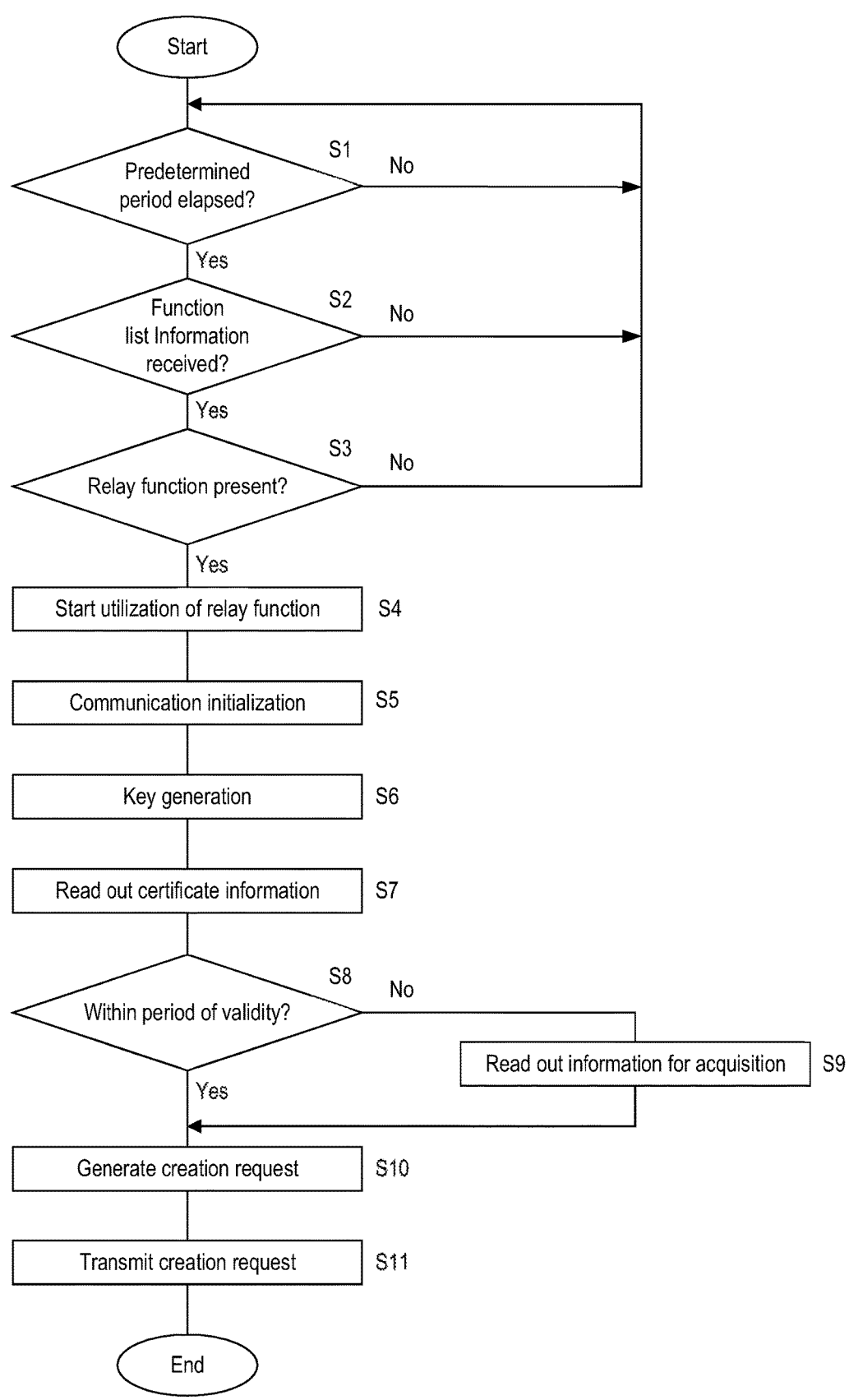
FIG. 7 is a flowchart showing the procedure of certificate information creation request processing that is performed by the in-vehicle communication apparatus.

FIG. 7 is a flowchart showing the procedure of certificate information creation request processing that is performed by the in-vehicle communication apparatus 10. The processing unit 11 of the in-vehicle communication apparatus 10 determines whether a predetermined period such as several weeks, several months, or several years, for example, has elapsed since the last certificate information acquisition (step S1). Note that this predetermined period is set to a period that is shorter than the period of the period of validity set when the certificate information was created, and the in-vehicle communication apparatus 10 that acquired the certificate information makes a creation request at least one time during the period of validity. If the predetermined period has not elapsed (S1: NO), the processing unit 11 waits until the predetermined period elapses. If the predetermined period has elapsed (S1: YES), the relay function determination unit 21 of the processing unit 11 determines whether function list information has been received from the roadside communication apparatus 3 with the road-vehicle communication unit 15 (step S2). If the function list information has not been received (S2: NO), the relay function determination unit 21 returns the processing to step S1. If the function list information has been received from the roadside communication apparatus 3 (S2: YES), the relay function determination unit 21 determines whether the roadside communication apparatus 3 has a relay function, on the basis of the received function list information (step S3). If the roadside communication apparatus 3 does not have a relay function (S3: NO), the relay function determination unit 21 returns the processing to step S1. If the roadside communication apparatus 3 has a relay function (S3: YES), the processing unit 11 starts utilization of the relay function of the roadside communication apparatus 3 by performing processing such as switching to a communication channel for utilizing the relay function, for example (step S4).

The processing unit 11 thereafter utilizes the relay function of the roadside communication apparatus 3 to perform communication initialization processing with the sub-server apparatus 52a (step S5). After the communication initialization processing is finished, the key generation processing unit 22 of the processing unit 11 generates the set of the private key and the public key (step S6). The processing unit 11 then reads out the certificate information 12b stored in the storage unit 12 (step S7). The processing unit 11 determines whether the read certificate information 12b is within the period of validity (step S8). If the certificate information 12b is within the period of validity (S8: YES), the request processing unit 23 of the processing unit 11 generates a creation request to which the public key generated in step S6 and the certificate information 12b read in step S7 are attached (step S10), transmits the generated creation request to the sub-server apparatus 52a (step S11), and finishes the processing.

Conversely, if the read certificate information 12b is not within the period of validity (S8: NO), the request processing unit 23 reads out the information for acquisition 12c stored in the storage unit 12 (step S9). The request processing unit 23 generates a creation request to which the public key generated in step S6 and the information for acquisition 12c read in step S9 are attached (step S10), transmits the generated creation request to the sub-server apparatus 52a (step S11), and finishes the processing.

Figure 8:
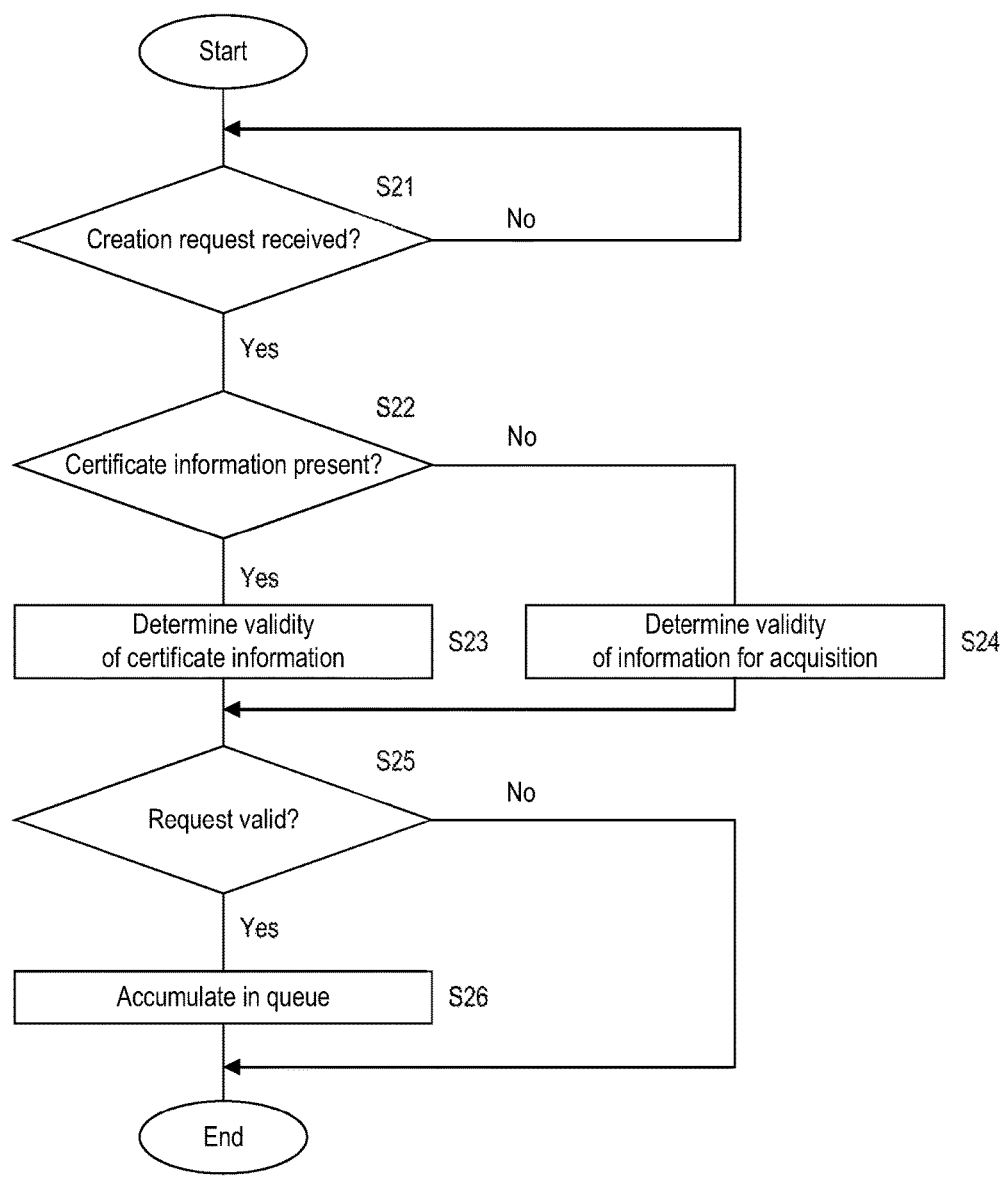
FIG. 8 is a flowchart showing the procedure of creation request reception processing performed by the server apparatus.

FIG. 8 is a flowchart showing the procedure of creation request reception processing performed by the sub-server apparatus 52a. The processing unit 61 of the sub-server apparatus 52a determines whether a creation request for certificate information has been received from communication with an in-vehicle communication apparatus 10 via the roadside communication apparatus 3 (step S21). If no creation request has been received (S21: NO), the processing unit 61 waits until a creation request is received. If a creation request has been received (S21: YES), the processing unit 61 determines whether certificate information is attached to the received creation request (step S22). If certificate information is attached to the creation request (S22: YES), the processing unit 61 performs processing for determining the validity of the certificate information (step S23), and advances the processing to step S25. If no certificate information is attached to the creation request (S22: NO), that is, if information for acquisition is attached to the creation request, the processing unit 61 performs processing for determining the validity of the information for acquisition on the basis of the information for confirmation 62b stored in the storage unit 62 (step S24), and advances the processing to step S25.

Based on the validity determination processing performed in step S23 or S24, the processing unit 11 determines whether the received creation request is a valid request (step S25). If the request is valid (S25: YES), the processing unit 11 accumulates the received creation request in a queue of creation requests for certificate information (step S26), and finishes the creation request reception processing. If the request is not valid (S25: NO), the processing unit 11 does not accept the creation request and finishes the processing. Note that the queue in which the creation requests are accumulated is realized by utilizing a portion of a storage region of the storage unit 62, for example.

Figure 9:
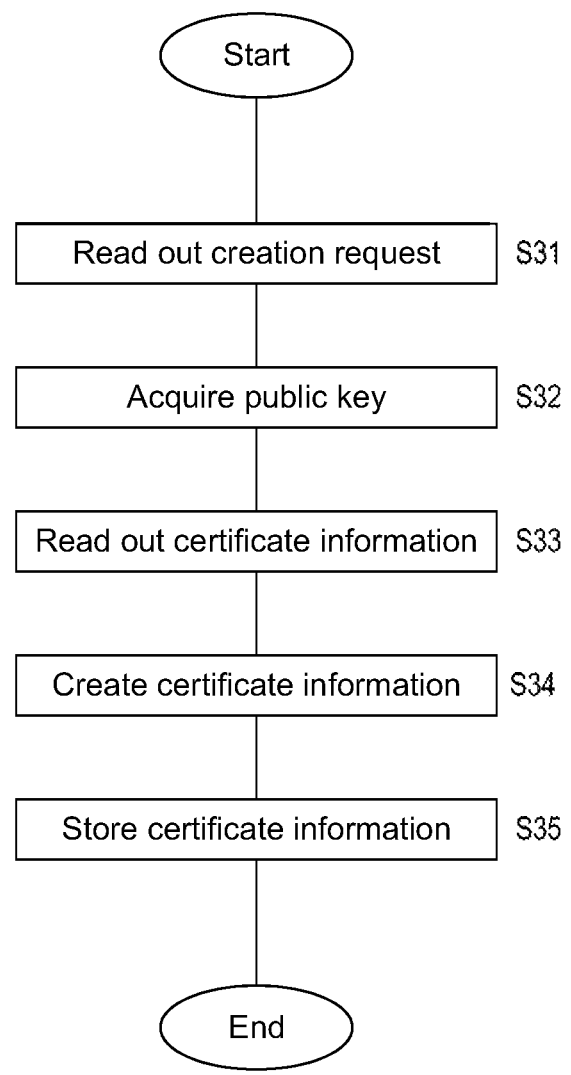
FIG. 9 is a flowchart showing the procedure of creation processing of the certificate information performed by the sub-server apparatus.

FIG. 9 flowchart showing the procedure of creation processing of the certificate information performed by the sub-server apparatus 52a. The certificate information creation processing unit 61a of the processing unit 61 of the sub-server apparatus 52a reads out any one creation request from one or a plurality of creation requests accumulated in the queue (step S31). The certificate information creation processing unit 61a acquires the public key attached to the read creation request (step S32). Also, the certificate information creation processing unit 61a reads out its own certificate information 62a stored in the storage unit 62 (step S33). The certificate information creation processing unit 61a uses the public key acquired in step S32, its own certificate information 62a read in step S33, and the like, creates the requested certificate information for the in-vehicle communication apparatus 10 (step S34), stores the requested certificate information in the storage unit 62 and the like (step S35), and finishes the processing.

Figure 10:
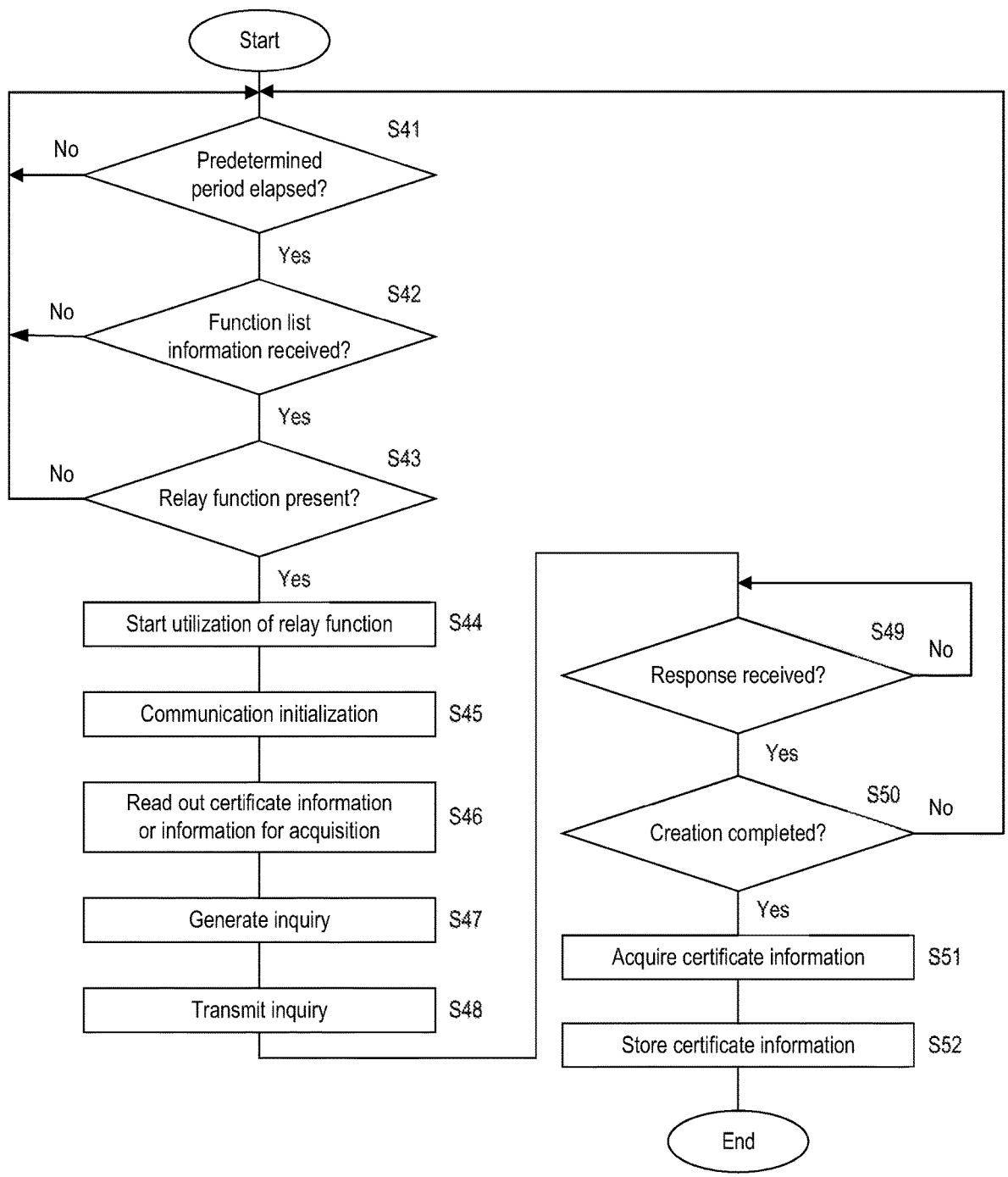
FIG. 10 is a flowchart showing the procedure of creation status inquiry processing regarding the certificate information performed by the in-vehicle communication apparatus.

FIG. 10 flowchart showing the procedure of creation status inquiry processing regarding the certificate information performed by the in-vehicle communication apparatus, which is processing performed after the creation request processing shown in FIG. 7. The processing unit 11 of the in-vehicle communication apparatus 10 determines whether a predetermined period such as a few second, several seconds, or a few minutes has elapsed from the request for the creation of the certificate information or from the previous inquiry (step S41). If the predetermined period has not elapsed (S41: NO), the processing unit 11 waits until the predetermined period elapses. If the predetermined period has elapsed (S41: YES), the relay function determination unit 21 of the processing unit 11 determines whether function list information has been received from the roadside communication apparatus 3 with the road-vehicle communication unit 15 (step S42). If the function list information has not been received (S42: NO), the relay function determination unit 21 returns the processing to step S41. If the function list information has been received from the roadside communication apparatus 3 (S42: YES), the relay function determination unit 21 determines, on the basis of the received function list information, whether the roadside communication apparatus 3 has a relay function (step S43). If the roadside communication apparatus 3 does not have a relay function (S43: NO), the relay function determination unit 21 returns the processing to step S41. If the roadside communication apparatus 3 has a relay function (S43: YES), the processing unit 11 starts utilization of the relay function of the roadside communication apparatus 3, by performing processing such as switching to a communication channel for utilizing the relay function, for example (step S44).

The processing unit 11 thereafter utilizes the relay function of the roadside communication apparatus 3 to perform communication initialization processing with the sub-server apparatus 52a (step S45). After the communication initialization processing is finished, the inquiry processing unit 24 of the processing unit 11 reads out the certificate information 12b or the information for acquisition 12c from the storage unit 12 which is the same as the processing for the creation request performed when making the creation request for the certificate information (step S46). The inquiry processing unit 24 attaches the read certificate information 12b or information for acquisition 12c and generates an inquiry of the creation status of the certificate information (step S47), and transmits the generated inquiry to the sub-server apparatus 52a (step S48).

The inquiry processing unit 24 then determines whether a response has been received from the sub-server apparatus 52a pertaining to the inquiry (step S49). If no response has been received (S49: NO), the inquiry processing unit 24 waits until a response is received. When a response is received (S49: YES), the inquiry processing unit 24 determines whether the requested creation of the certificate information has been completed, on the basis of the received response (step S50). If the creation has been completed (S50: YES), the certificate information acquisition processing unit 25 of the processing unit 11 acquires the certificate information from the sub-server apparatus 52a received together with the response (step S51), stores the acquired certificate information in the storage unit 12 as new certificate information 12b (step S52), and finishes the processing. If the creation has not been completed (S50: NO), the processing unit 11 returns the processing to step S41 and repeats the above processing until the certificate information is acquired from the sub-server apparatus 52a.

Figure 11:
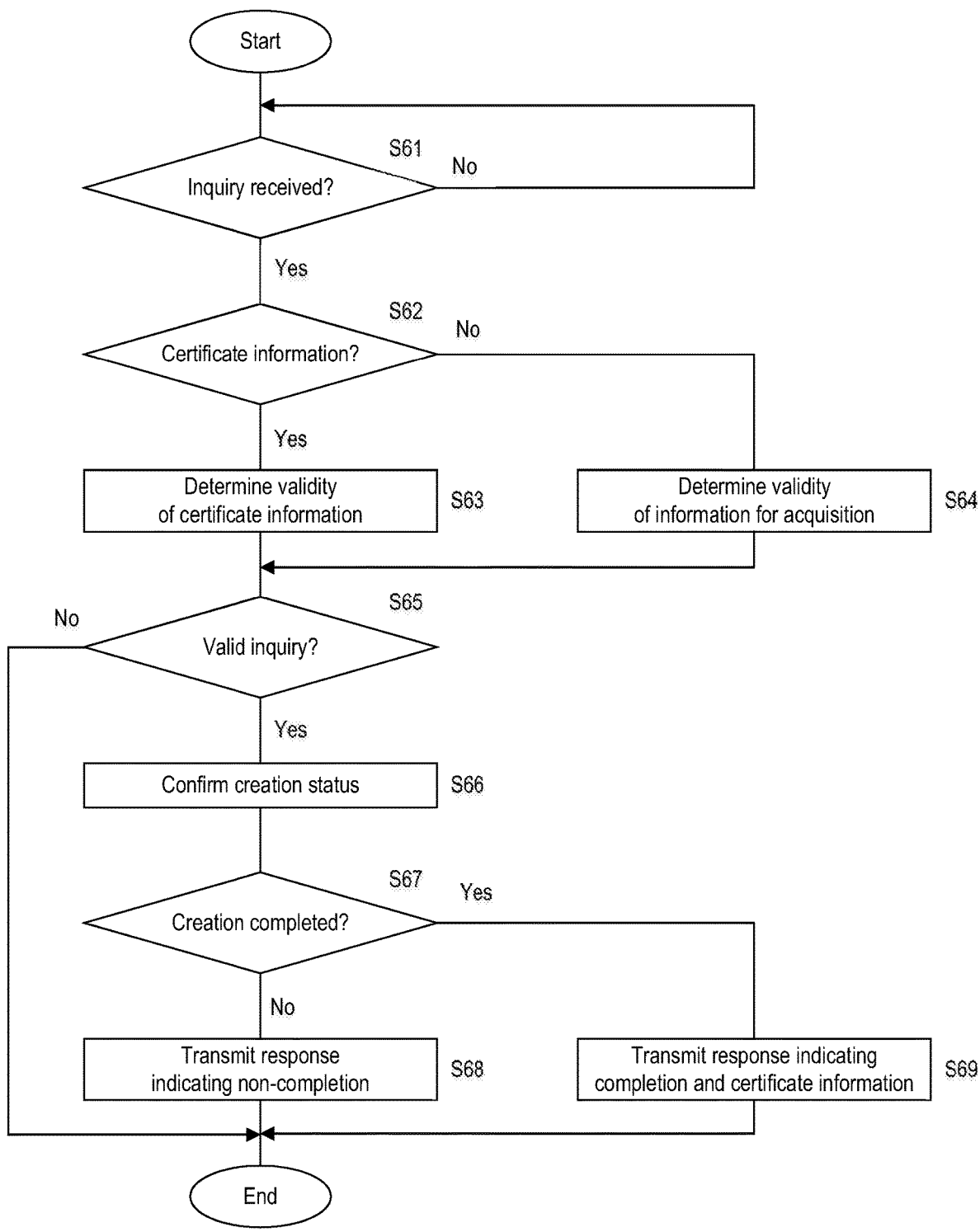
FIG. 11 is a flowchart showing the procedure of response processing performed by the sub-server apparatus.

FIG. 11 is a flowchart showing the procedure of response processing performed by the sub-server apparatus 52a. The processing unit 61 of the sub-server apparatus 52a determines whether an inquiry of the creation status for certificate information has been received from communication with an in-vehicle communication apparatus 10 via the roadside communication apparatus 3 (step S61). If no inquiry has been received (S61: NO), the processing unit 61 waits until an inquiry is received. If an inquiry has been received (S61: YES), the processing unit 61 determines whether certificate information has been attached to the received inquiry (step S62). If certificate information is attached to the inquiry (S62: YES), the processing unit 61 performs processing for determining the validity of the certificate information (step S63), and advances the processing to step S65. If no certificate information is attached to the inquiry (S62: NO), that is, if information for acquisition is attached to the inquiry, the processing unit 61 performs processing for determining the validity of the information for acquisition on the basis of the information for confirmation 62b stored in the storage unit 62 (step S64), and advances the processing to step S65.

Based on the validity determination processing performed in step S63 or S64, the processing unit 11 determines whether the received inquiry is a valid inquiry (step S65). If the inquiry is not valid (S65: NO), the processing unit 11 finishes the processing. If the inquiry is valid (S65: YES), the response processing unit 61b of the processing unit 11 confirms the creation request for the certificate information related to the inquiry (step S66) and determines whether the creation of this certificate information has been completed (step S67). If the creation of the certificate information related to the inquiry has not been completed (S67: NO), the response processing unit 61b transmits a response indicating that the creation of the certificate information has not been completed, to the in-vehicle communication apparatus 10 that is the source of the inquiry (step S68), and finishes the processing. If the creation of the certificate information has been completed (S67: YES), the response processing unit 61b transmits a response indicating that the creation of the certificate information has been completed together with the created certificate information, to the in-vehicle communication apparatus 10 that is the source of the inquiry (step S69), and finishes the processing.

In Summary

In the communication system according to the present embodiment configured above, the in-vehicle communication apparatus 10 mounted in the vehicle 1 communicates, via the roadside communication apparatus 3 installed on a road, with the sub-server apparatuses 52a to 52c of the certificate information issuing system 5 which creates electronic certificate information, and acquires certificate information from the sub-server apparatuses 52a to 52c. At this time the in-vehicle communication apparatus 10 first makes a request to the sub-server apparatuses 52a to 52c to create the certificate information, and the sub-server apparatuses 52a to 52c create the certificate information in response to the request. Because the processing for creating the certificate information is complex and the sub-server apparatuses 52a to 52c are provided with creation requests from multiple in-vehicle communication apparatuses 10, the sub-server apparatuses 52a to 52c may not be able to create the certificate information promptly in response to the request from the in-vehicle communication apparatus 10. Accordingly, the in-vehicle communication apparatus 10 makes an inquiry to the sub-server apparatuses 52a to 52c regarding the creation status of the certificate information after making the creation request for the certificate information. Upon receipt of the inquiry, the sub-server apparatuses 52a to 52c make a response indicating whether or not requested creation of the certificate information has been completed, and if the creation of the certificate information has been completed, the sub-server apparatuses 52a to 52c transmit the created certificate information to the in-vehicle communication apparatus 10 together with the response. When the in-vehicle communication apparatus 10 receives a response indicating that the creation of the certificate information has not been completed, the in-vehicle communication apparatus 10 is able to, for example, make the inquiry again after a predetermined period has elapsed. When the in-vehicle communication apparatus 10 receives a response indicating that the creation of the certificate information has been completed, the in-vehicle communication apparatus 10 acquires the certificate information transmitted by the sub-server apparatuses 52a to 52c together with the response. As a result, the in-vehicle communication apparatus 10 is able to communicate with the sub-server apparatuses 52a to 52c via the roadside communication apparatus 3 and acquire the certificate information when the vehicle 1 has entered a wireless communication region with the roadside communication apparatus 3 while the vehicle 1 is traveling and the like.

Also, the in-vehicle communication apparatus 10 generates a set of a private key and a public key. The private key is used for encrypting information and the public key is used for decrypting the encrypted information. The in-vehicle communication apparatus 10 transmits the generated public key to the sub-server apparatuses 52a to 52c together with the creation request for the certificate information. As a result, the sub-server apparatuses 52a to 52c are able to create certificate information that includes information of the public key. For example, when the system is configured so that the private key and the public key are generated by the sub-server apparatuses 52a to 52c, there is a need to transmit the private key from the sub-server apparatuses 52a to 52c to the in-vehicle communication apparatus 10 and there is a concern that leakage of information may occur when the private key is transmitted or received. By configuring the system so that the private key and the public key are generated by the in-vehicle communication apparatus 10, such leakage of the private key can be prevented.

Also, the in-vehicle communication apparatus 10 transmits the acquired certificate information 12b stored in the storage unit 12 together with the creation request to the sub-server apparatuses 52a to 52c when making the request for the creation of the certificate information to the sub-server apparatuses 52a to 52c. The sub-server apparatuses 52a to 52c that receive the creation request determine the validity of the certificate information 12b received together with the creation request and create new certificate information if the certificate information 12b is valid. As a result, the credibility of the creation request made by the in-vehicle communication apparatus 10 to the sub-server apparatuses 52a to 52c can be improved.

Also, the period of validity is set in the certificate information created by the sub-server apparatuses 52a to 52c for the in-vehicle communication apparatus 10. The in-vehicle communication apparatus 10 makes a request for the creation of new certificate information to the sub-server apparatuses 52a to 52c before the period of validity of the own certificate information 12b stored in the storage unit 12 expires. As a result, the certificate information within the validation period is used and the in-vehicle communication apparatus 10 is able to make the creation request for the certificate information to the sub-server apparatuses 52a to 52c.

For example, there is a possibility that a state in which the in-vehicle communication apparatus 10 is not able to communicate with the roadside communication apparatus 3 may continue over a long period and the validation period of the certificate information 12b may expire within this period. In this case, there is a concern that the in-vehicle communication apparatus 10 may not be able to utilize its own certificate information 12b and make a creation request for the new certificate information to the sub-server apparatuses 52a to 52c.

Accordingly, the in-vehicle communication apparatus 10 stores, in the storage unit 12, the information for acquisition 12c which has a limited number of usages. The information for acquisition 12c is information that can be used one time or a plurality of times, for example, and after the information for acquisition 12c has been used a predetermined number of times, the information for acquisition 12c is erased from the storage unit 12, for example, and cannot be used. When the period of validity of the certificate information 12b stored in the storage unit 12 has expired, the in-vehicle communication apparatus 10 makes a request for the creation of new certificate information by transmitting the information for acquisition 12c stored in the storage unit 12 to the sub-server apparatuses 52a to 52c. The sub-server apparatuses 52a to 52c store, in the storage unit 62, the information for confirmation 62b for determining whether the information for acquisition 12c of the in-vehicle communication apparatus 10 is valid, and if the information for acquisition 12c provided by the in-vehicle communication apparatus 10 is valid, the sub-server apparatuses 52a to 52c create the new certificate information. As a result, the failure of communication with an apparatus external to the vehicle due to the expiry of the period of validity of the certificate information 12b can be prevented in the in-vehicle communication apparatus 10 that may not be able to communicate constantly with the sub-server apparatuses 52a to 52c.

Also, the in-vehicle communication apparatus 10 makes an inquiry about the creation status of the certificate information to the sub-server apparatuses 52a to 52c periodically in a predetermined cycle such as, for example, every few minutes, every several minutes, or every few hours. Consequently, the in-vehicle communication apparatus 10 is able to reliably acquire the certificate information.

Also, the in-vehicle communication apparatus 10, in the case where the road-vehicle communication unit 15 becomes communicable with the roadside communication apparatus 3, acquires the function list information from the roadside communication apparatus 3, and determines whether this roadside communication apparatus 3 has a relay function. The in-vehicle communication apparatus 10 is thereby able to efficiently and reliably communicate with the sub-server apparatuses 52a to 52c, according to the functions of the roadside communication apparatus 3.

Note that, in the present embodiment, the certificate information issuing system 5 is provided with a two-level configuration configured by the root certificate authority 51 and the sub-certificate authorities 52a to 52c, but the present disclosure is not limited thereto. For example, one certificate authority that is not formed with a hierarchical structure may be configured to create the certificate information. Also, for example, the certificate information issuing system 5 may be configured as a three-level configuration configured by a root certificate authority, a plurality of first sub-certificate authorities whose electronic certificate information is issued by the root certificate authority, and a plurality of second sub-certificate authorities whose electronic certificate information is issued by the first sub-certificate authorities. Furthermore, the certificate information issuing system 5 may be provided with a configuration having four or more levels.

Also, although the in-vehicle communication apparatus 10 is provided with the vehicle-vehicle communication unit 14 that performs vehicle-vehicle communication, the present disclosure is not limited thereto, and a configuration may be adopted in which vehicle-vehicle communication is not performed. Also, the in-vehicle communication apparatus 10 may be further provided with a wireless communication function such as a mobile phone communication network or a wireless LAN, for example. Also, the vehicle-vehicle communication unit 14 that performs vehicle-vehicle communication and the road-vehicle communication unit 15 that performs road-vehicle communication may be mounted in the vehicle 1 as separate apparatuses to the in-vehicle communication apparatus 10, rather than being provided in the in-vehicle communication apparatus 10. Also, the roadside communication apparatus 3 is configured to be provided in the traffic light 2 on the road, but is not limited thereto, and may be provided in an on-road installation other than the traffic light 2.

First Modification

Figure 12:
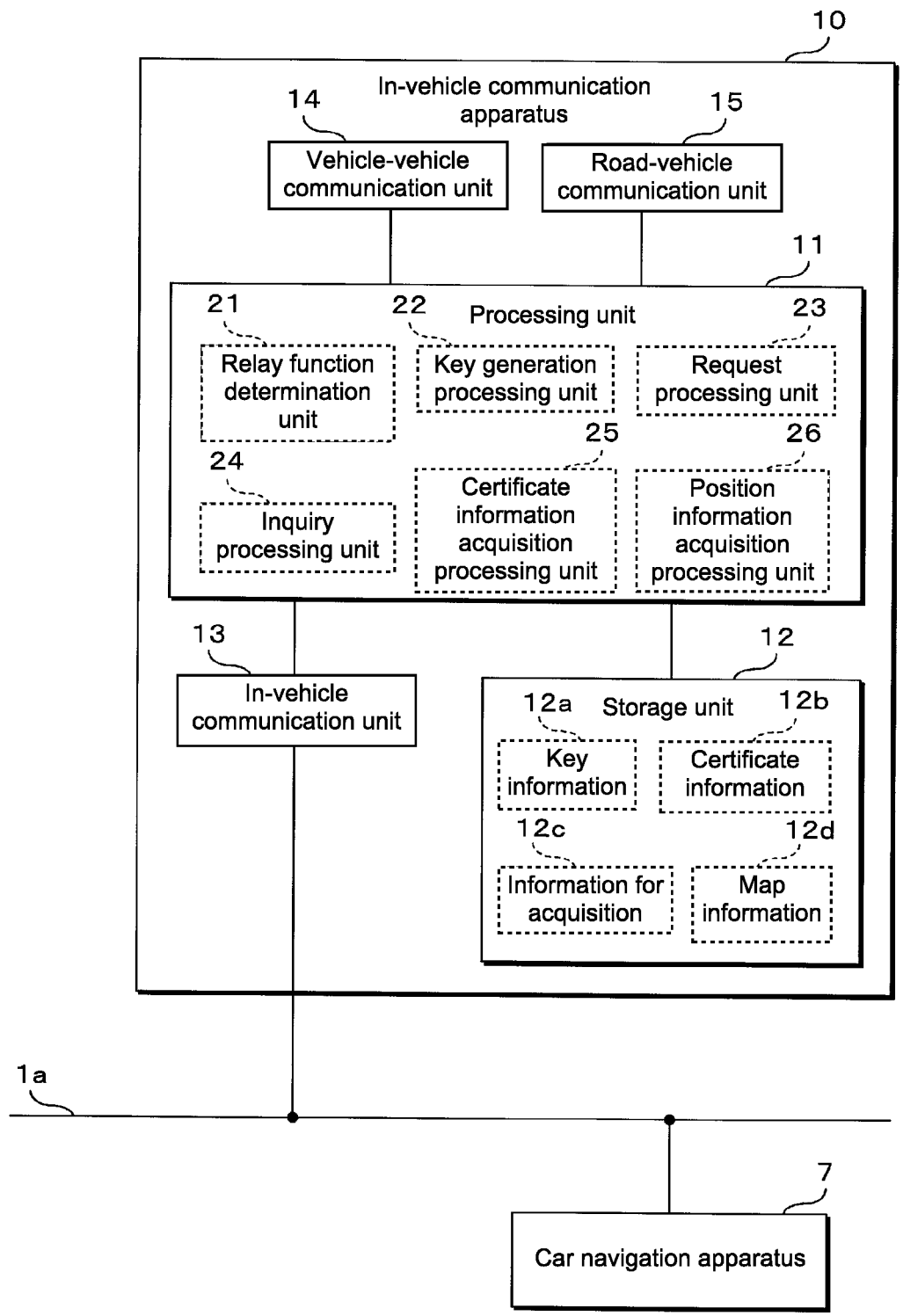
FIG. 12 is a block diagram showing the configuration of the in-vehicle communication apparatus according to a modification.

The in-vehicle communication apparatus 10 according to a first modification is configured to make the inquiry about the creation status of the certificate information to the sub-server apparatuses 52a to 52c in accordance with position information of the vehicle. FIG. 12 is a block diagram showing the configuration of the in-vehicle communication apparatus 10 according to a modification. The in-vehicle communication apparatus 10 according to the first modification communicates, using the internal communication unit 13, with a car navigation apparatus 7 mounted in the vehicle 1. The car navigation apparatus 7 is an apparatus that specifies the position of the vehicle 1 on the basis of information that is obtained from GPS, a gyro sensor or the like, and performs route guidance to a destination input by a user. The car navigation apparatus 7 transmits the position information of the vehicle 1 to the internal network 1a. A position information acquisition processing unit 26 provided in the processing unit 11 of the in-vehicle communication apparatus 10 acquires the position information of the vehicle 1 (e.g., latitude, longitude, etc.) transmitted by the car navigation apparatus 7 by receiving the information with the internal communication unit 13.

The in-vehicle communication apparatus 10 according to the first modification stores map information 12d in the storage unit 12. The map information 12d includes information pertaining to installation positions of the roadside communication apparatuses 3. The processing unit 11 of the in-vehicle communication apparatus 10 according to the first modification repeatedly acquires the position information of the vehicle 1 with the position information acquisition processing unit 26 after the request processing unit 23 has made a request for creating new certificate information to the sub-server apparatuses 52a to 52c. The processing unit 11 determines that the vehicle 1 has entered a predetermined range from the installation position of the roadside communication apparatus 3 on the basis of the acquired position information and the information of the installation position of the roadside communication apparatus 3 included in the map information 12d in the storage unit 12. When the vehicle 1 has left the predetermined range of one roadside communication apparatus 3 and entered the predetermined range of another roadside communication apparatus 3, the inquiry processing unit 24 of the processing unit 11 makes the inquiry to the sub-server apparatuses 52a to 52c via this roadside communication apparatus 3.

The processing performed by the in-vehicle communication apparatus 10 according to the first modification, for inquiring about the creation status of the certificate information can be realized by determining whether the vehicle 1 has entered a predetermined range of a roadside communication apparatus 3 different from the roadside communication apparatus 3 utilized when making the creation request or the previous inquiry, instead of or in addition to determining whether the predetermined period has elapsed in step S41 of the flow chart shown in FIG. 10. Also, the in-vehicle communication apparatus 10 according to the first modification may be configured to determine the travel distance of the vehicle 1 on the basis of the position information acquired by the position information acquisition processing unit 26, and make the inquiry when the vehicle 1 has traveled a predetermined distance from when the creation request or the previous inquiry was made.

Second Modification

In the communication system according to the second modification, regions in which the plurality of sub-certificate authorities 52a to 52c that are included in the certificate information issuing system 5 are respectively in charge of issuing electronic certificate information have been determined. For example, a sub-certificate authority is provided for each specific region such as the Kanto region and the Kansai region in Japan, and issues electronic certificate information for vehicles 1 that are situated in that region. Information for distinguishing the region in which each sub-certificate authority is in charge is included in the map information 12d stored in the storage unit 12 by the in-vehicle communication apparatus 10. The in-vehicle communication apparatus 10 according to the second modification is able to determine which sub-certificate authority is in charge of the region in which the vehicle 1 is situated, by comparing the position information of the vehicle 1 acquired from the car navigation apparatus 7 with the information of the region in which each sub-certificate authority is in charge included in the map information 12d.

The in-vehicle communication apparatus 10 according to the second modification repeatedly acquires position information from the car navigation apparatus 7 while the vehicle 1 is traveling, and repeatedly determines which sub-certificate authority is in charge of the region in which the vehicle 1 is situated. In the case where the vehicle 1 moves from the region in which one sub-certificate authority is in charge to a region in which another sub-certificate authority is in charge, the in-vehicle communication apparatus 10 communicates with the sub-certificate authorities 52a to 52c that are in charge of this region via the roadside communication apparatus 3, and makes a creation request for the new certificate information. The in-vehicle communication apparatus 10 is thereby able to acquire new certificate information in the case of having moved to a region in which another sub-certificate authority is in charge, due to the movement of the vehicle 1

Note that creation request processing of the in-vehicle communication apparatus 10 according to the second modification can be realized by determining whether the vehicle 1 has moved to a region in which another sub-certificate authority is in charge, instead of determining whether a predetermined period has elapsed, in step S1 of the flowchart shown in FIG. 7. Note that the in-vehicle communication apparatus 10 may perform both the creation request for the certificate information every predetermined period and the creation request for the certificate information that corresponds to the position information of the vehicle 1.

The invention claimed is:

1. A communication system comprising an in-vehicle communication apparatus mounted in a vehicle, and a server apparatus that creates electronic certificate information to be used in communication by the in-vehicle communication apparatus, wherein:
   the communication system is further provided with a roadside communication apparatus that is installed on a road, and that communicates wirelessly with the in-vehicle communication apparatus and communicates with the server apparatus;
   the in-vehicle communication apparatus comprising:
   a wireless communication unit that communicates wirelessly with the roadside communication apparatus;
   a request processing unit that performs processing for making a request for a creation of certificate information to the server apparatus via the roadside communication apparatus;
   an inquiry processing unit that performs processing for making an inquiry about a creation status of the certificate information the creation of which was requested to the server apparatus via the roadside communication apparatus; and
   a certificate information acquisition processing unit that performs processing for acquiring the certificate information from the server apparatus via the roadside communication apparatus.

2. The communication system according to claim 1, wherein the server apparatus comprises:
   a creation processing unit that performs processing for creating certificate information in response to the request from the in-vehicle communication apparatus; and
   a response processing unit that performs processing for making a response with regard to the creation status of the requested certificate information, in response to the inquiry from the in-vehicle communication apparatus; and
   the response processing unit transmits the created certificate information together with the response to the in-vehicle communication apparatus when the certificate information pertaining to the inquiry has been created, and
   the certificate information acquisition processing unit of the in-vehicle communication apparatus acquires the certificate information transmitted together with the response from the server apparatus.

3. The communication system according to claim 2, wherein the in-vehicle communication apparatus comprises a key generation processing unit that performs processing to generate a set of a private key and a public key,
the request processing unit of the in-vehicle communication apparatus transmits the public key, which is generated by the key generation processing unit, together with the creation request for the certificate information, to the server apparatus, and
the creation processing unit of the server apparatus creates the certificate information on the basis of the public key provided by the in-vehicle communication apparatus.

4. The communication system according to claim 2, wherein the request processing unit of the in-vehicle communication apparatus transmits the acquired certificate information when making a request for the creation of new certificate information to the server apparatus, and
the creation processing unit of the server apparatus creates the new certificate information when the certificate information provided by the in-vehicle communication apparatus is valid.

5. The communication system according to claim 4, wherein a period of validity is set in the certificate information, and
the request processing unit of the in-vehicle communication apparatus makes a request, to the server apparatus, for the creation of new certificate information before the period of validity of the acquired certificate information has expired.

6. The communication system according to claim 5, Wherein the in-vehicle communication apparatus has a storage unit that stores information for acquiring certificate information having a limited usage count,
the request processing unit of the in-vehicle communication apparatus transmits the information for acquiring certificate information stored in the storage unit instead of the acquired certificate information when making a request for the creation of new certificate information to the server apparatus when the period of validity of the acquired certificate information has expired, and
the creation processing unit of the server apparatus creates the new certificate information when the information for acquiring certificate information provided by the in-vehicle communication apparatus is valid.

7. The communication system according to claim 1, wherein the inquiry processing unit of the in-vehicle communication apparatus periodically makes inquiries to the server apparatus.

8. The communication system according to claim 1, wherein the in-vehicle communication apparatus has a position information acquisition processing unit that performs processing for acquiring position information of the vehicle, and
the inquiry processing unit of the in-vehicle communication apparatus makes an inquiry to the server apparatus in accordance with the position information acquired by the position information acquisition processing unit.

9. The communication system according to claim 1, wherein the in-vehicle communication apparatus comprises a relay function determination unit that communicates wirelessly with the roadside communication apparatus, using the wireless communication unit, and determines whether the roadside communication apparatus has a function for relaying communication with the server apparatus.

10. An in-vehicle communication apparatus that is mounted in a vehicle and that communicates using electronic certificate information created by a server apparatus, the in-vehicle communication apparatus comprising:
a wireless communication unit that communicates wirelessly with a roadside communication apparatus installed on a road;
a request processing unit that performs processing for making a request for a creation of certificate information to the server apparatus via the roadside communication apparatus;
an inquiry processing unit that performs processing for making an inquiry about the creation status of the certificate information the creation of which was requested to the server apparatus via the roadside communication apparatus; and
a certificate information acquisition processing unit that performs processing for acquiring certificate information from the server apparatus via the roadside communication apparatus.

* * * * *